United States Patent
Sakamura et al.

(10) Patent No.: US 7,346,718 B2
(45) Date of Patent: Mar. 18, 2008

(54) AUTONOMOUS INTEGRATED-CIRCUIT CARD

(75) Inventors: Ken Sakamura, 9-2, Osaki 4-chome, Shinagawa-ku, Tokyo (JP); Noboru Koshizuka, 27-20, Nishikubo 2-chome, Musashino-shi, Tokyo (JP); Kazuhiko Ishii, Yokohama (JP); Kensaku Mori, Yokohama (JP); Hiroshi Aono, Yokosuka (JP); Sadayuki Hongo, Yokohama (JP)

(73) Assignees: Ken Sakamura, Tokyo (JP); Noboru Koshizuka, Musashino-shi (JP); NTT DoCoMo, Inc., Tokyo (JP)

( * ) Notice: Subject to any disclaimer, the term of this patent is extended or adjusted under 35 U.S.C. 154(b) by 116 days.

(21) Appl. No.: 10/457,512

(22) Filed: Jun. 10, 2003

(65) Prior Publication Data

US 2004/0034766 A1 Feb. 19, 2004

(30) Foreign Application Priority Data

Jun. 10, 2002 (JP) ............................ P2002-169315

(51) Int. Cl.
*G06F 13/42* (2006.01)
(52) U.S. Cl. ..................... 710/106; 710/305; 713/161; 713/185; 235/380
(58) Field of Classification Search ................ 710/105, 710/8, 62, 110; 709/229, 250; 713/161, 713/169, 165, 168, 159, 181, 194; 711/115; 717/167; 719/313; 705/41–44, 67, 1; 235/382, 235/375, 380, 492; 340/928; 380/29, 248; 370/402, 235; 714/31
See application file for complete search history.

(56) References Cited

U.S. PATENT DOCUMENTS

| | | | | |
|---|---|---|---|---|
| 4,907,270 A | * | 3/1990 | Hazard | 713/181 |
| 5,204,512 A | * | 4/1993 | Ieki et al. | 235/382 |
| 5,434,395 A | | 7/1995 | Storck et al. | |
| 5,491,692 A | * | 2/1996 | Gunner et al. | 370/402 |
| 5,532,689 A | * | 7/1996 | Bueno | 340/928 |

(Continued)

FOREIGN PATENT DOCUMENTS

EP 1 158 750 A1 * 11/2001

(Continued)

OTHER PUBLICATIONS

IEEE 100 The Authoritative Dictionary of IEE Standards Terms, 2000, The Institute of Electrical and Electronics Engineers, Inc., 7th Edition, p. 804.*

*Primary Examiner*—Christopher E. Lee
(74) *Attorney, Agent, or Firm*—Oblon, Spivak, McClelland, Maier & Neustadt, P.C.

(57) ABSTRACT

An autonomous integrated circuit card includes a logic external communication interface which directly communicates with a communication device connected to an integrated circuit card terminal main body via a network, in addition to a host device interface connected to an integrated card reader/writer via a physical layer. A communication control unit includes a software module which directly communicates with the communication device via the external communication interface. A central processing unit performs authentication via the communication control unit and reads value information stored in a nonvolatile memory. Further, the central processing unit encrypts the read value information by use of an encryption processing unit and directly transmits the encrypted value information to the communication device via the communication control unit and the external communication interface.

15 Claims, 5 Drawing Sheets

U.S. PATENT DOCUMENTS

| | | | | |
|---|---|---|---|---|
| 5,668,875 A | * | 9/1997 | Brown et al. | 380/248 |
| 5,710,421 A | * | 1/1998 | Kokubu | 235/492 |
| 5,771,227 A | * | 6/1998 | Benayoun et al. | 370/235 |
| 5,778,071 A | * | 7/1998 | Caputo et al. | 713/159 |
| 5,867,577 A | * | 2/1999 | Patarin | 705/67 |
| 5,889,272 A | * | 3/1999 | Lafon et al. | 235/380 |
| 5,901,303 A | * | 5/1999 | Chew | 711/115 |
| 5,905,245 A | * | 5/1999 | Tanaka | 235/375 |
| 5,923,884 A | * | 7/1999 | Peyret et al. | 717/167 |
| 6,073,198 A | * | 6/2000 | Meyer et al. | 710/110 |
| 6,073,236 A | * | 6/2000 | Kusakabe et al. | 713/169 |
| 6,157,966 A | * | 12/2000 | Montgomery et al. | 710/8 |
| 6,182,215 B1 | * | 1/2001 | Tatebayashi et al. | 713/168 |
| 6,185,681 B1 | * | 2/2001 | Zizzi | 713/165 |
| 6,212,649 B1 | * | 4/2001 | Yalowitz et al. | 714/31 |
| 6,247,644 B1 | * | 6/2001 | Horne et al. | 235/380 |
| 6,516,997 B1 | * | 2/2003 | Tanazawa et al. | 235/380 |
| 6,644,554 B1 | * | 11/2003 | Shiro et al. | 235/492 |
| 6,704,872 B1 | * | 3/2004 | Okada | 713/194 |
| 6,708,878 B2 | * | 3/2004 | Eguchi et al. | 235/380 |
| 6,751,671 B1 | * | 6/2004 | Urien | 709/229 |
| 6,769,609 B2 | * | 8/2004 | Ono et al. | 235/380 |
| 6,810,521 B1 | * | 10/2004 | Gelgon et al. | 719/313 |
| 7,149,816 B1 | * | 12/2006 | Port et al. | 709/250 |
| 2001/0050989 A1 | * | 12/2001 | Zakiya | 380/29 |
| 2002/0082847 A1 | * | 6/2002 | Vandewalle et al. | 705/1 |
| 2002/0083317 A1 | * | 6/2002 | Ohta et al. | 713/161 |
| 2003/0037191 A1 | * | 2/2003 | Baranowski et al. | 710/62 |

FOREIGN PATENT DOCUMENTS

JP  09-190515  * 7/1997

* cited by examiner

AUTONOMOUS INTEGRATED-CIRCUIT CARD

CROSS REFERENCE TO RELATED APPLICATION

This application claims benefit of priority under 35 U.S.C. § 119 to Japanese Patent Application No. 2002-169315, filed on Jun. 10, 2002, the entire contents of which are incorporated by reference herein.

BACKGROUND OF THE INVENTION

1. Field of the Invention

The present invention relates to an integrated circuit (IC) card, more specifically, to an autonomous IC card which is configured to directly and autonomously communicate with another device connected to an IC card terminal directly or via a network.

2. Description of the Related Art

FIG. 1 is a view for describing a conventional scheme of exchanges of signals between an IC card and an IC card terminal.

Here, the IC card terminal includes an IC card reader/writer 200 and an IC card terminal main body 300. Although an IC card 100 and the IC card reader/writer 200 are schematically illustrated as being separated herein, the IC card 100 and the IC card reader/writer 200 may be configured into a contact less type as described therein, or alternatively, the IC card 100 and the IC card reader/writer 200 may be configured into a contact type in which the IC card 100 is typically inserted into the IC card reader/writer 200.

Upon processing by use of the IC card 100 as described above, the IC card terminal main body 300 serves as a master device and the IC card 100 serves as a slave device. In other words, when an operator intends to execute processing by use of the IC card 100, the operator firstly inputs an instruction to an input terminal (not shown) provided to the IC card terminal main body 300. In response to the instruction, the IC card terminal main body 300 being the master device transmits a command to the IC card 100 via the IC card reader/writer 200. Upon receipt of the command, the IC card 100 being the slave device executes processing corresponding to the command, and returns an execution result to the IC card terminal main body 300 via the IC card reader/writer 200.

FIG. 2 is a view for describing a conventional scheme of exchanges of signals in the case where two IC cards communicate with each other.

In the drawing, an IC card reader/writer 200b is connected to the IC card terminal main body 300 in addition to the configuration shown in FIG. 1. Here, an IC card 100b is connected to the IC card reader/writer 200b either in a contactless mode or in a contact mode.

As similar to the case in FIG. 1, an operator firstly inputs an instruction concerning communication between the IC cards to the input terminal (not shown) provided to the IC card terminal main body 300. In response to the instruction, the IC card terminal main body 300 transmits a command to an IC card 100a via an IC card reader/writer 200a. Upon receipt of the command, the IC card 100a executes processing corresponding to the command, and outputs a response A which is an execution result. The response A outputted from the IC card 100a is inputted to the IC card terminal main body 300 via the IC card reader/writer 200a. The IC card terminal main body 300 performs a relaying operation of information, concerning the response A in this case. The response A outputted from the IC card terminal main body 300 is inputted to the IC card 100b via the IC card reader/writer 200b. The IC card 100b executes processing corresponding to the inputted response A, and outputs a response B which is an execution result. The response B outputted from the IC card 100b is inputted to the IC card terminal main body 300 via the IC card reader/writer 200b. The IC card terminal main body 300 performs a relaying operation of information, concerning the response B in this case. The response B outputted from the IC card terminal main body 300 is inputted to the IC card 100a via the IC card reader/writer 200a.

The operations are basically the same when the above-described exchanges between the IC card 100a and the IC card 100b continue. In other words, the IC card terminal main body 300 always plays a role to perform relaying operations of information exchanged between the IC card 100a and the IC card 100b.

Incidentally, in conventional communication between IC cards, the IC card terminal main body always plays the role to perform relaying operations of information concerning the communication between the IC cards as described above. Therefore, conventionally, an intermediate device as represented by the IC card terminal main body has been capable of falsification or theft of the information communicated between the IC cards. Hence there has been conventionally a problem that communication of accurate information between the IC cards is not ensured.

SUMMARY OF THE INVENTION

The present invention has been made in the light of the foregoing problem. It is an object of the present invention to provide an autonomous IC card capable of ensuring safe communication of accurate information by directly communicating with another communication device seemingly without interposing an intermediate device, such as an IC card terminal, between the IC card and the another communication device when the IC card communicates with the another communication device connected to the IC card terminal directly or via a network.

To attain the foregoing object, there is provided an autonomous IC card comprising a logic host interface which is connected to an IC card terminal via a physical layer, a logic external communication interface which communicates with a communication device connected thereto via the IC card terminal physically, and an IC chip configured to recognize connection of the communication device and directly communicate with the communication device via the logic external communication interface.

According to the present invention, the autonomous IC card can autonomously recognize the communication device connected thereto via the IC card terminal, and directly communicate with the communication device.

In a preferred embodiment of the present invention, the IC chip includes a communication control unit being a software module which directly communicates with the communication device via the logic external communication interface.

According to the present invention, the communication control unit can execute processing by use of the software module which is not conscious of the connected IC card terminal.

In a preferred embodiment of the present invention, the communication control unit includes a session management command group which establishes a session communication path for the communication device, and a transaction management command group which establishes a transaction session for the communication device.

In a preferred embodiment of the present invention, the IC chip includes an encryption processing unit which performs mutual authentication processing with the communication device and encrypts and decrypts information concerning communication with the communication device.

According to the present invention, the encryption processing unit performs the mutual authentication processing with the communication device, and encrypts and decrypts the information concerning the communication with the communication device.

In a preferred embodiment of the present invention, the IC chip includes an assigned unique identifier. Here, the IC chip identifies the communication device and performs the mutual authentication processing based on the identifier.

In a preferred embodiment of the present invention, the encryption processing unit selects an appropriate authentication process and an appropriate encryption process out of a plurality of authentication processes and a plurality of encryption processes respectively to perform those processes, depending on a type of the identified communication device.

In a preferred embodiment of the present invention, the IC chip includes a storage unit which stores value information. Here, the IC chip communicates with the communication device concerning the value information.

The nature, principle and utility of the invention will become more apparent from the following detailed description when read in conjunction with the accompanying drawings.

DETAILED DESCRIPTION OF THE PREFERRED EMBODIMENTS

Now, an embodiment of an autonomous IC card according to the present invention will be described in detail with reference to the accompanying drawings.

Figure 1:
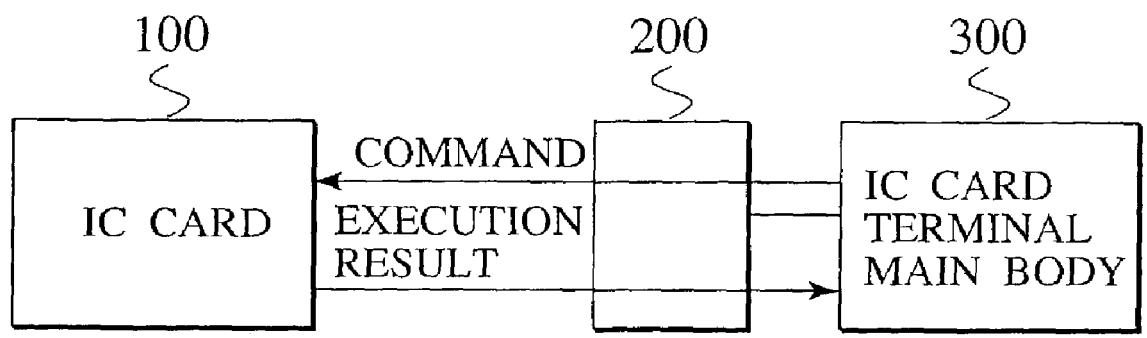
FIG. 1 is a view for describing a conventional scheme of exchanges of signals between an IC card and an IC card terminal.
Figure 2:
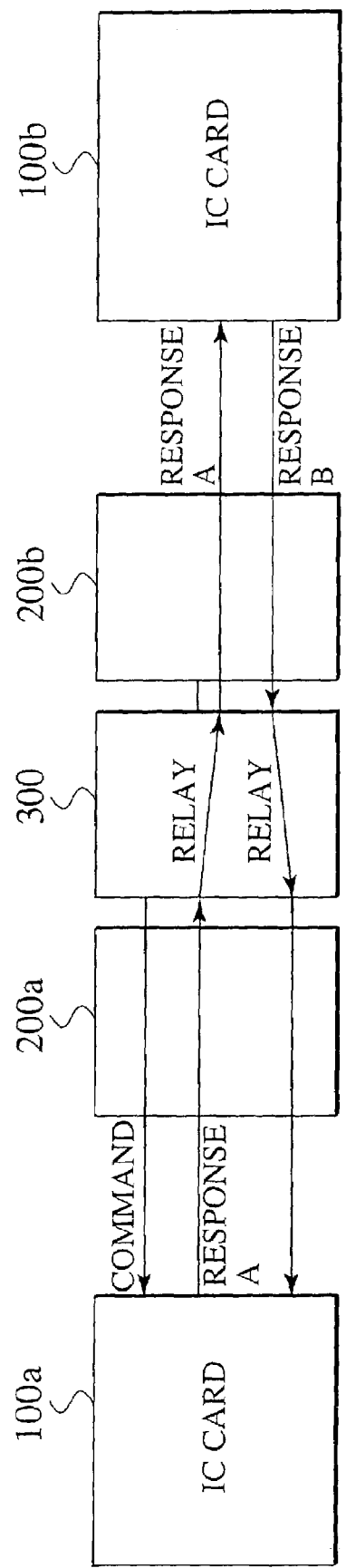
FIG. 2 is a view for describing a conventional scheme of exchanges of signals in the case where two IC cards communicate with each other.
Figure 3:
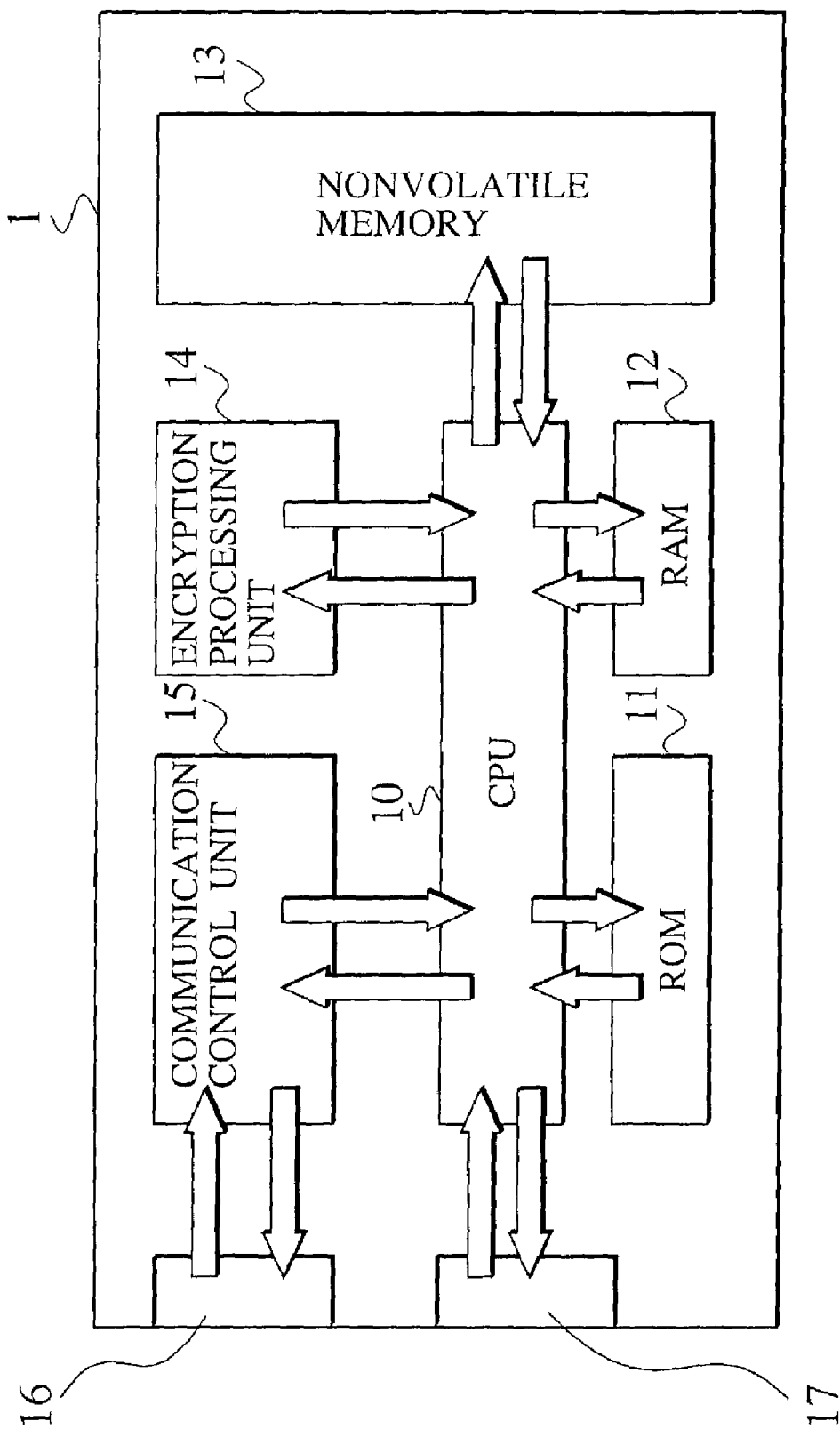
FIG. 3 is a view showing a logical configuration of one embodiment of an IC card according to the present invention.

FIG. 3 is a view showing a logical configuration of one embodiment of the IC card according to the present invention.

In FIG. 3, an autonomous IC card 1 of the present invention includes a central processing unit (CPU) 10, a read-only memory (ROM) 11, a random access memory (RAM) 12, a nonvolatile memory 13, an encryption processing unit 14, a communication control unit 15, an external communication interface 16, and a host device interface 17.

Here, the above-described configuration is a mixture of a physical configuration (hardware) and a logical configuration (software). Description will be made below severally regarding both the configurations.

The host device interface 17 is a conventionally provided physical interface for performing external communication. As similarly to the related art, the host device interface 17 includes a contact type and a contactless type. The CPU 10 is a central processing unit which executes all kinds of operations except part of floating-point operations. Note that a floating-point processing unit (not shown) is specially provided for executing some floating-point operations. The ROM 11 is a read-only memory in which software (such as an operating system (OS) or programs) unique to the autonomous IC card 1 and a chip ID of the present invention to be described later are stored. The RAM 12 is a random access memory in which data treated by the software which operates inside the autonomous IC card are temporarily stored. Contents in the RAM 12 are completely deleted when power supply to the IC card is stopped.

The nonvolatile memory 13 stores value information to be described later. The value information is equivalent to data containing values such as electronic tickets and electronic money. Note that since the nonvolatile memory 13 is a memory designed to preserve contents, the contents therein are preserved even if the power supply is stopped.

These are the physical configuration elements.

The external communication interface 16 is a logical interface which allows a chip of the present invention to be described later, which includes the CPU 10 and the like, to perform direct communication with the outside. A conventional IC card only includes a logic interface for communicating only with a device which is physically connected thereto, typically, only with an IC card terminal. However, the autonomous IC card 1 of the present invention includes the external communication interface 16 which performs direct communication with an external device (a service client with the chip of the present invention incorporated therein, which will be described later) in addition to the logic host interface. Note that this external communication interface 16 is an interface which performs communication in accordance with a protocol to be described in detail later in "4. API protocol for the present chip".

The communication control unit 15 is a software module which controls communication with the external device via the external communication interface 16. The communication control unit 15 is the software module which realizes the entirety of "10. API specification for the present chip" to be described later. The software module is closely related to "10.1 Session management command group" and "10.2 Transaction management command group" in particular. Communication is performed directly with the external device by use of this module.

The encryption processing unit 14 is a module for enabling various types of mutual authentication and encryption communication as defined in "3.4 Authentication, access control and encryption", "5. eTP key certificate", and "6. key entity", which will be described later. The encryption processing unit 14 selects and switches appropriate mutual authentication and appropriate encryption communication out of a plurality of options of mutual authentication and a plurality of options of encryption communication respectively. Here, the risk of theft of the data contents or falsification of the data via the intermediate device such as the IC card terminal will be further reduced by performing the mutual authentication and the encryption communication by use of the encryption processing unit 14.

Note that a configuration unit according to the present invention shown in FIG. 3 is preferably materialized by use of a one-chip microcomputer (hereinafter referred to as an "IC chip"), specifications of which will be listed in detail in the last part of the description of the embodiment.

Now, description will be made regarding overall characteristics of the IC chip to be incorporated in the autonomous IC card of the present invention.

The IC chip according to the present invention is designed to function as anode in a distributed environment. Therefore, if a device, in which the IC card of the present invention is connected to an IC card terminal main body including an IC card reader/writer either in a contact mode or in a contactless mode to operate the device, is configured to be capable of physically communicating with, for example, another IC card via a network, each of those IC cards severally including the IC chips according to the present invention has a function as a node on the communication network. Moreover, in this event, the IC card reader/writer and the IC card terminal main body play a role as a gateway (bridge) for making communicable a physical layer of contactless communication with the network. In other words, the above-described external communication interface 16 controls the IC card communication as the node in a distributed system, while the host device interface 17 plays the role for making communicable the physical layer of the contactless communication.

Therefore, in order to function as the node in the distributed environment, the IC chip according to the present invention has a unique identifier (ID) in the entire distributed system, which is represented by the above-described network as the simplest example.

Moreover, the IC chip incorporated in the autonomous IC card of the present invention identifies a plurality of devices which are connected via the network and severally provided with the similar IC chips, and performs mutual authentication with those devices first. The IC card is designed to then perform communication with those devices after confirming those devices as qualified entities. There are two modes upon the authentication, namely, an (information) issuer mode and an owner mode. These modes will be described in detail later.

Furthermore, the IC chip according to the present invention adopts an access control list based on the above-described ID to protect resources owned by the IC chip. That is, the access control list is added to each of chips and files (and records).

The IC chip according to the present invention deals with "owner", "issuer", and "other" service clients uniformly. The IC card issues an application programming interface (API) for changing the access control list in accordance with authority owned by each service client. In this way, the IC chip can flexibly perform control such as restriction, release, or transfer of access rights.

Meanwhile, the IC chip according to the present invention supports a hybrid mode for retaining contents while distributing the contents among a plurality of contents holders, for example, between the chip of the present invention and a value information storage server on the network. The IC chip according to the present invention further provides a link function between the contents as a mechanism for supporting the hybrid mode.

Next, description will be made regarding a concrete example of communication by use of the autonomous IC card of the present invention.

Figure 4:
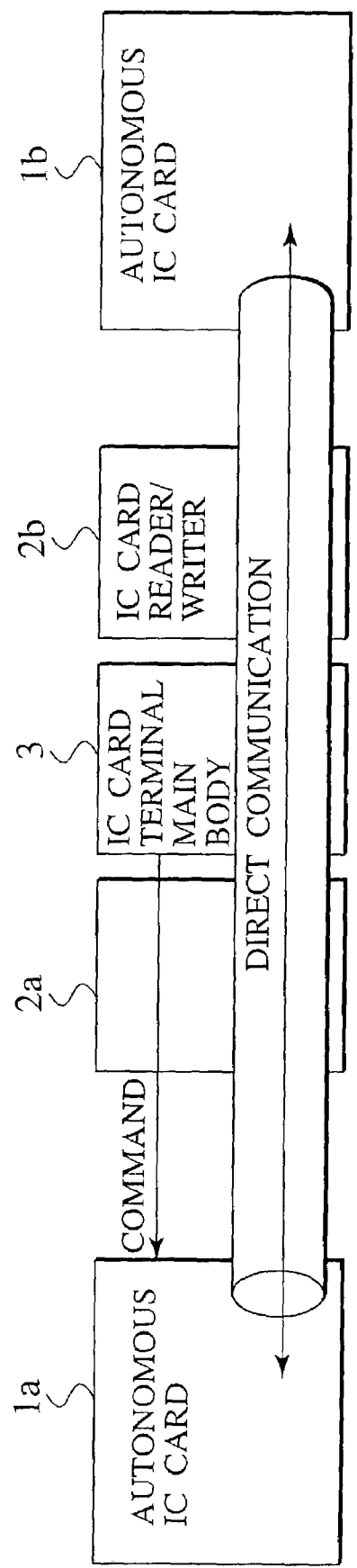
FIG. 4 is a view showing a system configuration for performing communication between IC cards by use of an autonomous IC card of the present invention.

FIG. 4 is a view showing a system configuration for performing communication between IC cards by use of the autonomous IC card of the present invention.

In the drawing, an autonomous IC card 1a is connected to an IC card reader/writer 2a provided on an IC card terminal main body 3 either in a contact mode or in a contactless mode. Meanwhile, an autonomous IC card 1b is similarly connected to an IC card reader/writer 2b provided on the IC card terminal main body 3 either in a contact mode or in a contactless mode.

In the configuration as described above, when an operator intends to cause the autonomous IC card 1a to communicate with the autonomous IC card 1b, the operator inputs an instruction to an input terminal (not shown) provided to the IC card terminal main body 3. In response to the instruction, the IC card terminal main body 3 transmits a command to the IC card 1a via the IC card reader/writer 2a. Upon receipt of the command, the autonomous IC card 1a directly and autonomously communicates with the autonomous IC card 1b in a software manner via the external communication interface 16 shown in FIG. 3. The reason why the autonomous IC card 1a can directly communicate with the autonomous IC card 1b is because the autonomous IC card 1a can function as the node in the distributed environment as described above. Upon such communication, if the encryption processing unit 14 shown in FIG. 3 encrypts and decrypts the communication data, it is possible to surely prevent the risk such as falsification or theft of the data in the course of communication.

Figure 5:
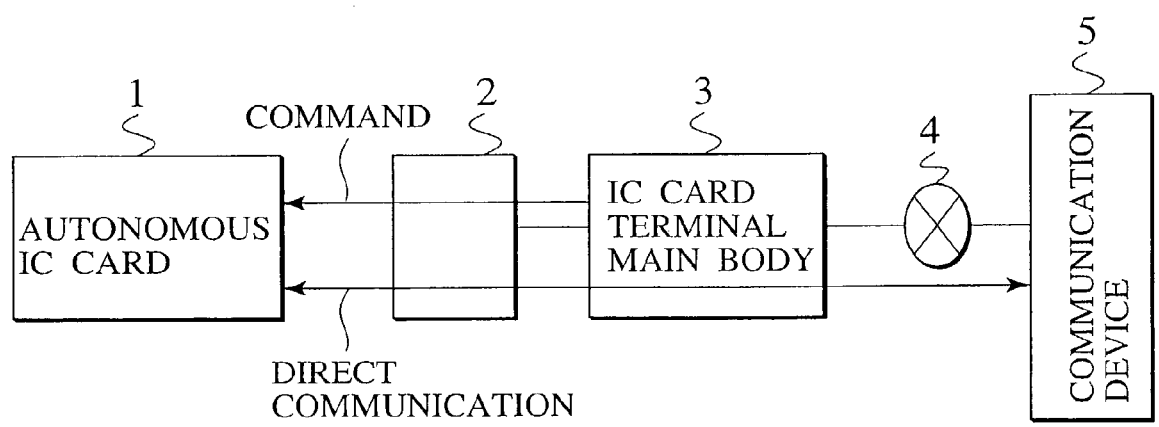
FIG. 5 is a view showing another system configuration for performing communication by use of the autonomous IC card of the present invention.

FIG. 5 is a view showing another system configuration for performing communication by use of the autonomous IC card of the present invention.

Upon the communication by use of the autonomous IC card of the present invention, the other one to communicate with does not need to be an IC card, but may be another communication device. In the drawing, the IC card terminal main body 3 is connected to a communication device 5 via a network 4. When the autonomous IC card 1 communicates with the communication device 5 via the network 4, the autonomous IC card 1 which has received a command from the IC card terminal main body 3 communicates with the communication device 5 directly and autonomously in a software manner.

Now, description will be made regarding detailed specifications of the IC chip (hereinafter simply referred to as the "present chip") which is incorporated in the autonomous IC card of the present invention. In the following description, contents holders (CHs) correspond to the above-described autonomous IC cards 1 and 1a, and service clients (SCs) correspond to all the devices communicating with the autonomous IC cards 1 and 1a, that is, to the above-described IC card terminal main body 3, the autonomous IC card 1b, and the communication device 5.

Here, in order to facilitate understanding of the overview, a table of contents will be provided hereunder and indexes will be provided to the respective configurations of the IC chip in the following description.

TABLE OF CONTENTS

1. Introduction
   1.1 The present chip as a node in the distributed environment
   1.2 Mutual authentication method specified with the present chip ID
   1.3 Resources protection mechanism by the access control list method based on the present chip ID 1.4 Realization of comprehensive access control on the chip owner, the value information issuer, and the value information user
  1.5 Transaction mechanism with roll-back capability
  1.6 Storage structure having the link function
  1.7 Consistency with related chip systems
  1.8 Moderate standardization corresponding to various chips
2. System Specification
  2.1 System architecture
  2.2 The present chip identifier (the present chip ID)
3. Outlines of the Present Chip
  3.1 The present chip
  3.2 Data structure model
  3.3 The present chip API
  3.4 Authentication, access control and encryption
4. The Present Chip API Protocol
  4.1 Packet type
  4.2 List of command identifiers (command ID)
  4.3 List of error codes
  4.4 MAC, trailer
  4.5 Session communication and non-session communication
5. eTP Key Certificate
  Utilization of the certificate upon authentication during session establishment
  1. Outline
  2. Details
6. Key Entity
7. Standard Content Format of the Invention
8. Settlement Processing in Operating Standard CONTENTS of the Invention by the Key Entity
9. Specifications of the Present Chip API (Data Type Definitions)
10. Specifications of the Present Chip API (Command Definitions)
  10.1 Session management command group
  10.2 Transaction management command group
  10.3 File management command group
  10.4 Record management command group
  10.5 Key entity management command group
  10.6 Authentication assistance management command group

SPECIFICATIONS OF ENCRYPTION IMPLEMENTATION

1. Introduction

The present chip (a value information-added chip) is a computer system (such as an IC card) which constitutes a storage medium for value information in a highly functional distributed system which a project related to the present invention aims for, and external specifications of the computer system. Based on the assumption of future technological advance, the present chip is put into a series of the 8-bit CPU version, the 16-bit CPU version, and the 32-bit CPU version, and the present chip provides a common command and a common message format concerning a common operation. Among various systems of the specifications of the present chip, this description particularly explains an overview of the specifications in the case of adopting the IC chip of the 16-bit CPU version as a target hardware.

In this chapter, description will be made regarding characteristics of the present chip in comparison with other existing tamper-resistant chips.

1.1 The Present Chip as a Node in the Distributed Environment

Unlike a conventional IC chip which is designed as a computer peripheral unit to be operated via a reader/writer, the present chip is designed as a node in a distributed environment. A service provider module on a network and the chip, and the chip and a card, perform peer-to-peer communication on an equal basis. A reader/writer device constitutes a gateway (bridge) for making communicable a physical layer of contactless communication with a local area network (LAN).

In architecture of the present chip, the present chip has an identifier (the present chip ID) which is unique in the entire distributed system. The present chip ID is used not only for identifying the chip physically, but also for controlling a path in the distributed environment. Here, upon authentication communication, the present chip ID is utilized by the other one to communicate with as an identifier.

Therefore, the target for authentication of the present chip is not the reader/writer, but is calculation entities (contents holders) on the network, the calculation entities exchanging information with the chip via the network and the reader/writer.

1.2 Mutual Authentication Method Specified with the Present Chip ID

The present chip performs communication after performing mutual authentication and thereby confirming that the other one to communicate with is a qualified entity. In the present chip architecture, the present chip-incorporated contents holders (CHs) and the present chip-incorporated service clients (SCs) both include consistent unique identifiers (the present chip ID), and identify the present chip ID of the other one to communicate with after the mutual authentication.

1.3 Resources Protection Mechanism by the Access Control List Method Based on the Present Chip ID The present chip specifies a SC which issues the present chip API through the mutual authentication. Therefor, an access control list based on the present chip ID is used to protect resources owned by the present chip. The present chip at the moment expresses attributes such as an "issuer", an "owner" and the like by use of the present chip ID with respect to the resources. Moreover, it is possible to designate commands which can be issued by the "issuer", the "owner", and "other" SCs by use of the access control list.

1.4 Realization of Comprehensive Access Control on the Chip Owner, the Value Information Issuer, and the Value Information User Various applications storing value information may be implemented in the present chip. The value information includes various types. For example, the following types of information are conceivable as the information in the chip:
  information which cannot be changed by the chip owner but only by the information issuer (e.g. a seat number of an electronic ticket);
  information which is not disclosed even to the chip owner (e.g. a key for changing the electronic ticket);
  information which can be fully controlled only by the chip owner (e.g. personal information of the chip owner); and
  information which can be read by anybody.

The present chip uniformly treats the "issuer", the "owner", and the "other" SCs in the access control list, and issues an API for changing the access control list in accordance with authority owned by each SC. In this way, the present chip can flexibly perform control such as restriction, release, or transfer of access rights.

1.5 Transaction Mechanism with Roll-back Capability

It is essential to safely transfer the value information to the present chip. Therefor, concerning creation and deletion of the value information in particular, the present chip provides a transaction mechanism to ensure atomicity of processing. After starting a transaction, an operation attributable to an issued command is reflected by a commit command upon ending the transaction. If an abort command is issued, or if the commit command does not reach on or before a defined timeout duration, then the issued command is subjected to roll-back. Similarly, if the present chip is powered off in the course of the transaction due to any trouble, then roll-back processing takes place in an initial state when the present chip becomes active again.

1.6 Storage Structure Having the Link Function

Various types of tamper-resistant chips currently exist in terms of information processing capability and also in terms of resources such as storage capacity or the like. Among all, there may be a case where hardware with small resources cannot store all the value information of conceivable applications into the chip. Meanwhile, it is also desirable in view of processing efficiency to adopt a method of distributing the value information into the chips for retention. Therefore, the present invention supports a hybrid method for distributing and retaining the contents among a plurality of the contents holders of the present invention, such as the present chip and a value information storage server on a network. Moreover, the present invention provides a link function between the contents as a mechanism for supporting the hybrid method.

1.7 Consistency with Related Chip Systems

The present chip has consistency with other architectures of the project related to the present invention regarding API command conventions, error codes, methods of statically and dynamically treating the resources, and the like. For example, general parts of the error codes are in common between a related chip and the present chip. In this way, the present invention assists an engineer having experience in development on the related chip architecture in developing the present chip applications.

1.8 Moderate Standardization Corresponding to Various Chips

The present chip provides API systems consistent with various IC cards including 8-bit to 32-bit CPUs, contact/contactless/dual interfaces, and smart cards to radio frequency identifications (RF-IDs).

2. System Specifications

2.1 System Architecture

The present chip architecture is distributed system architecture for safely storing tamper-resistant value information and for safely exchanging the tamper-resistant value information on a computer network. The present chip architecture essentially includes the following elements.

(A) Value Information Network Infrastructure (Entity Network Infrastructure)

This is the architecture for exchanging the value information and includes the following two elements.

A-i) The Present Chip-incorporated Content Holders (CHs)

The present chip-incorporated contents holders are calculation entities on the distributed system. The present chip-incorporated content holders store the value information and provides the present chip-incorporated API, thereby allowing operation of this value information from the outside. For example, the present chip-incorporated content holders include the following.

The present chip: A tamper-resistant LSI chip which safely stores the value information.

A present chip box: A large-volume electronic safe housed in a tamper-resistant casing, which safely stores the value information.

A-ii) The Present Chip-incorporated Service Clients (SCs)

The present chip-incorporated service clients are calculation entities for accessing the value information stored in the present chip-incorporated content holder through the present chip API. For example, the present chip-incorporated service clients include the following types.

The present chip: A sophisticated one of the present chips also has a function as a client.

An issuing server: A server which issues the value information and stores the value information in the present chip-incorporated content holder.

A service field system: An application system which uses the value information stored in the present chip. The service field system includes an electronic ticketing gate, for example.

*Attention: There exists also a calculation entity which serves as the present chip-incorporated service client as well as the present chip box.

(B) Authentication/Encryption Network Infrastructure (AENI)

This is an authentication system in the case where the present chip implements authentication and encryption of a public key encryption system. An authentication station plays a main role.

(C) Application Network Infrastructure (ANI)

This is equivalent to various communication systems which depend on applications. In the case of the electronic ticketing, for example, the application network infrastructure includes network protocols for instructing search or purchase of tickets, and the like. The instructions up to the purchase are conducted within the ANI frames, and transfer of the ticket being the value information is conducted in the ENI which applies the functions of the present chip.

2.2 The Present Chip Identifier (The Present Chip ID)

The present chip-incorporated content holders and service clients severally have unique identifiers, each of which is referred to as the present chip identifier (the present chip IDs). The present chip ID is used on the network for authentication of the present chip-incorporated content holders and service clients, path control of messages, and the like. The present chip ID is expressed by a 16-octet (128-bit) number.

* The present chip ID is an exchange format of an identifier used in the ENI communication protocols. The present chip ID does not define an internal saving format within the present chip.

* Considering facility of implementing the path control, it is also conceivable to adopt a implementing method which defines an identifier in a protocol on a network layer of the ENI directly as the present chip ID. For example, lower bits of a network address may be applied to the present chip ID without modification.

* The present chip ID for the owner will be defined as "0x00~00" (all "0").

For example, if the present chip-incorporated service client having the present chip ID "X" establishes a session after being authenticated in an owner authentication mode and then creates a file in the session, an issuer ID column of the file stores "0".

\* The present chip ID for an administrative superuser will be defined as "0xff~ff" (all "1").

3. Outlines of the Present Chip 3.1 The Present Chip

The present chip is a small-size calculation entity used for allowing a user, who directly receives services using the value information from various enterprises, to carry the value information. The present chip is an object to be mainly handled by these specifications. In general, the present chip is thought to be implemented principally on hardware such as an IC card, a smart card, or a portable terminal. Considering large differences in information processing capabilities and resources provided in these pieces of hardware, and also considering the fact that the tamper-resistant technology still remains at a stage of development, the specifications of the present chip provide various specifications corresponding to various types of hardware while standardizing only the interfaces, whereby the present chips are made into series.

TABLE 1

Table: Series of the present chip specifications

| | |
|---|---|
| The present chip/8 | for 8-bit CPU chip |
| The present chip/16 | for 16-bit CPU chip |
| The present chip/32 | for 32-bit CPU chip |
| The present chip/T | for terminal |

3.2 Data Structure Model

The value information to be stored in the present chip box or the present chip will be visible from outside as a following hierarchical data structure.

● Folder

A structure for compiling a plurality of sets of files.

Only a route folder exists in the present chip /16.

● File

The resources for storing the value information. Whereas a record is stored in the file, the present chip /16 adopts a structure in which only a single record is stored in one file.

3.3 The Present Chip API

The present chip is operated by the present chip API from the present chip-incorporated service client.

Basically, the present chip API is a protocol based on a session using the following procedures:

Mutual authentication and establishment of an encryption communication path between the present chip and the present chip-incorporated service client, → Establishment of a session (transaction);

Transmission of a command message; and

Cutoff of the session (transaction).

\*A session/transaction method involves a high frequency of message exchanges and therefore may be unsuitable for an application which requires high responsiveness such as "& Go". Accordingly, authentication or encryption is applied to each command message. A non-session protocol is also adopted concerning part of commands.

\* A command issued as "session ID=0" will be treated as a non-session mode.

■ Session Commands
eopn_ses Open Session
ecfm_ses Confirm Session
ecls_ses Close Session
■ Transaction Commands
eopn_tra Open Transaction
ecfm_tra Confirm Transaction
ecom_tra Commit Transaction
eabo_tra Abort Transaction
■ File Operation Commands
ecre_fil Create File
edel_fil Delete File
etra_fil Transfer File
eupd_fim Update File Mode
eenc_fil Encrypt File
edec_fil Decrypt File
■ Record Operation Commands
eupd_rec Update Record
erea_rec Read Record
■ Key Entity Operation Commands
ecre_key Create Key
edel_key Delete Key
eupd_key Update Key
■ Authentication Ancillary Command
ecfm_cer Confirm Certificate
■ Control Commands
epol_chp Polling Chip
eini_car Initialize Card
eupd_cer Update My Certificate
eupd_cpk Update CA Public Key 3.4 Authentication, Access Control and Encryption The present chip and the present chip-incorporated service client perform the mutual authentication upon establishing the session. Being specialized in the hardware or the like which is incorporated in the chip, various types of concrete algorithms for this authentication can be used.

• Authentication Modes

Authentication includes an (information) issuer mode and an owner mode, which are designated upon authentication. The authentication algorithm is (generally) different depending on each mode.

The (Information) Issuer Mode:

A mode to authenticate the present chip-incorporated service client as an issuer of the file. After being authenticated by the issuer mode, the file created by the present chip-incorporated service client becomes accessible with the issuer authority, and other resources become accessible with other authority.

The Owner Mode:

A mode to authenticate the present chip-incorporated service client as an owner of the chip. A human-friendly authentication method such as a password is usually used. The present chip-incorporated service client authenticated by the owner mode possesses the owner authority.

• Status of the Present Chip After the Mutual Authentication

After the authentication, the present chip retains the following information:

The present chip ID of the officially authenticated present chip-incorporated service client;

A common key for encryption of a message to be transmitted to the present chip-incorporated service client;

A common key for decryption of a message arrived from the present chip-incorporated service client;

The session ID; and

The session mode (the issuer mode/the owner mode).

• Access Control

The following information is attached to the chip and the file (and the record):

The present chip ID representing the issuer; and

The access control list (operations permitted depending on authorities).

The access is restricted in accordance with the authority to be owned by the session defined as below.

• File Access Mode

The mode for allowing the SC having the present chip ID=eid to access a file F in the present chip (the present chip ID of the present chip SC which has created the file F=F.eid) includes the following three types.

1. The Owner Access:

Access in the session after clearing the owner authentication

* In this case, eid=0x00 (all "0")

2. The (Information) Issuer Access:

Access in the session after clearing the (information) issuer authentication, where eid=F.eid.

3. Other Access

Access in the session after clearing (information) creator authentication, where eid !=F.eid, or access in a non-session mode.

• The Access Control List for a Route Folder

TABLE 2

| F | E | D | C | B | A | 9 | 8 |
|---|---|---|---|---|---|---|---|
| Reserved | Reserved | Reserved | Reserved | Reserved | Reserved | Reserved | Reserved |
| 7 | 6 | 5 | 4 | 3 | 2 | 1 | 0 |
| Reserve | Reserve | ACL5 | ACL4 | ACL3 | ACL2 | ACL1 | ACL0 |

ACL0 =0/1 ecre__fil owner access No/Yes
* whether or not creation of a file in a route folder is permitted by the owner access
ACL1 =0/1 ecre__fil other access No/Yes
* whether or not creation of a file in the route folder is permitted by an access other than the owner access
ACL2 =0/1 edel__fil owner access No/Yes
* whether or not deletion of a file from the route folder is permitted by the owner access
ACL3 =0/1 edel__fil other access No/Yes
* whether or not deletion of a file from the route folder is permitted by an access other than the owner access
ACL4 =0/1 etra__fil owner access No/Yes
* whether or not transfer of a file from the route folder is permitted by the owner access
ACL5 =0/1 etra__fil other access No/Yes
* whether or not transfer of a file from the route folder is permitted by an access other than the owner access

TABLE 3

|  | cre__fil | del__fil | tra__fil |
|---|---|---|---|
| Owner access | ACL0 | ACL2 | ACL4 |
| Issuer access | — | — | — |
| Other access | ACL1 | ACL3 | ACL5 |

* The (information) issuer of the route folder manages as the owner.

* In other words, a general value information server for filing the value information into the route folder and creating the key entity corresponds to the "other access" depending on the route folder.

• The access control list for a file

TABLE 4

| F | E | D | C | B | A | 9 | 8 |
|---|---|---|---|---|---|---|---|
| ACLf | ACLe | ACLd | ACLc | ACLb | ACLa | ACL9 | ACL8 |
| 7 | 6 | 5 | 4 | 3 | 2 | 1 | 0 |
| ACL7 | ACl6 | ACL5 | ACL4 | ACL3 | ACL2 | ACL1 | ACL0 |

ACL0 =0/1 eupd__rec owner access No/Yes
ACL1 =0/1 eupd__rec other access No/Yes
ACL2 =0/1 erea__rec owner access No/Yes
ACL3 =0/1 erea__rec other access No/Yes
ACL4 =0/1 eupd__fim owner access No/Yes
ACL5 =0/1 eupd__fim other access No/Yes
ACL6 =0/1 elst__fil owner access No/Yes
ACL7 =0/1 elst__fil other access No/Yes
ACL8 =0/1 edel__fil owner access No/Yes
ACL9 =0/1 edel__fil other access No/Yes
ACLa =0/1 etra__fil owner access No/Yes
ACLb =0/1 etra__fil other access No/Yes
ACLc =0/1 eenc__fil owner access No/Yes
ACLd =0/1 eenc__fil other access No/Yes
ACLe =0/1 edec__fil owner access No/Yes
ACLf =0/1 edec__fil other access No/Yes

TABLE 5

|  | upd_rec | rea_rec | upd_fim | lst_fil | del_fil | tra_fil | enc_fil | dec_fil |
|---|---|---|---|---|---|---|---|---|
| Owner access | ACL0 | ACL2 | ACL4 | ACL6 | ACL8 | ACLa | ACLc | ACLe |
| Issuer access | always yes | always yes | always yes | always yes | always yes | always yes | always yes | always yes |
| Other access | ACL1 | ACL3 | ACL5 | ACL7 | ACL9 | ACLb | ACLd | ACLf |

• The Access Control List for a Key Entity

TABLE 6

| F | E | D | C | B | A | 9 | 8 |
|---|---|---|---|---|---|---|---|
| ACLf | ACLe | ACLd | ACLc | ACLb | ACLa | ACL9 | ACL8 |
| 7 | 6 | 5 | 4 | 3 | 2 | 1 | 0 |
| ACL7 | ACl6 | ACL5 | ACL4 | ACL3 | ACL2 | ACL1 | ACL0 |

ACL0 =0/1 eupd_key owner access No/Yes
ACL1 =0/1 eupd_key other access No/Yes
ACL2 =0/1 erea_key owner access No/Yes
ACL3 =0/1 erea_key other access No/Yes
ACL4 =0/1 eupd_kym owner access No/Yes
ACL5 =0/1 eupd_kym other access No/Yes
ACL8 =0/1 edel_key owner access No/Yes
ACL9 =0/1 edel_key other access No/Yes
ACLc =0/1 eenc_fil owner access No/Yes
ACLd =0/1 eenc_fil other access No/Yes
ACLe =0/1 edec_fil owner access No/Yes
ACLf =0/1 edec_fil other access No/Yes

TABLE 7

|  | upd_key | rea_key | upd_kym | del_key | enc_fil | dec_fil |
|---|---|---|---|---|---|---|
| Owner access | ACL0 | ACL2 | ACL4 | ACL8 | ACLc | ACLe |
| Issuer access | always yes | always yes | always yes | always yes | always yes | always yes |
| Other access | ACL1 | ACL3 | ACL5 | ACL9 | ACLd | ACLf |

4. The Present Chip API Protocol 4.1 Packet Type

* The mark "□" on the right end of the packet type represents a unencrypted portion and the mark "■" represents an encrypted portion in an encoding session, respectively.

* Numeric data equal to or more than 2 octets are stored using Little Endian format.

A Routing Header

TABLE 8

| D0 | D1 | D2 | D3 | D4 | D5 | D6 | D7 |  |
|---|---|---|---|---|---|---|---|---|
| The present chip ID (Destination 0) | | | | | | | | □ |
| The present chip ID (Destination 1) | | | | | | | | □ |
| The present chip ID (Source 0) | | | | | | | | □ |
| The present chip ID (Source 1) | | | | | | | | □ |
| | | | | | | | | □ |
| | | | | | | | | □ |
| | | | | | | | | □ |

The Present Chip Session Unit (Forward)

TABLE 9

| D0 | D1 | D2 | D3 | D4 | D5 | D6 | D7 |  |
|---|---|---|---|---|---|---|---|---|
| SID | Serial No. | Command ID | Data Length (byte number) | | | Reserved | | □ |
| | | | | | | | | □ |
| DATA | | | | | | | | ■ |
| ... | | | | | | | | ■ |
| DATA | | | | | | | | ■ |
| | | | | | | | | ■ |

The Present Chip Session Unit (Backward)

TABLE 10

| D0 | D1 | D2 | D3 | D4 | D5 | D6 | D7 |  |
|---|---|---|---|---|---|---|---|---|
| SID | Serial No. | Error Code | Data Length (byte number) | | | Reserved | | □ |
| | | | | | | | | □ |
| DATA | | | | | | | | ■ |
| ... | | | | | | | | ■ |
| DATA | | | | | | | | ■ |
| | | | | | | | | ■ |

MAC, Trailer

TABLE 11

| D0 | D1 | D2 | D3 | D4 | D5 | D6 | D7 |  |
|---|---|---|---|---|---|---|---|---|
| MAC ID | MAC Length | | | Reserved | | | | □ |
| MAC (1) | | | | | | | | □ |
| MAC (MD5 e.g.: 2) | | | | | | | | □ |
| | | | | | | | | □ |
| | | | | | | | | □ |

*MAC is attached to the data after encryption.

4.2 List of Command Identifiers (Command ID)

A command identifier (command ID) of the present chip API is expressed by a positive 1-byte integer.

The command identifiers are commonly defined in the series of the present chips /8, 16, and 32, which are as follows.

TABLE 12

Table: List of the command identifiers of the present chip API

| ID | Mnemonic | 8/16/32 | Meaning |
|---|---|---|---|
| 0x01 | eopn_ses | ⊙⊙⊙ | Open Session |
| 0x02 | ecfm_ses | ⊙⊙⊙ | Confirm Session |
| 0x03 | ecls_ses | ⊙⊙⊙ | Close Session |
| 0x04 | eopn_ses | xOO | Open Transaction |
| 0x05 | ecfm_tra | xOO | Confirm Transaction |
| 0x06 | ecom_tra | xOO | Commit Transaction |
| 0x07 | eabo_tra | xOO | Abort Transaction |
| (0x11 | ecre_fol | xxO | Create Folder) |
| (0x12 | edel_fol | xxO | Delete Folder) |
| (0x13 | eupd_fom | xxO | Update Folder Mode |
| 0x21 | ecre_fil | OOO | Create File |
| 0x22 | edel_fil | OOO | Delete File |
| 0x23 | etra_fil | xOO | Transfer File |
| (0x24 | erdm_fil | xxO | Redeem File) |
| 0x25 | eenc_fil | xOO | Encrypted File |
| 0x26 | edec_fil | xOO | Decrypted File |
| 0x27 | eupd_fim | OOO | Update File Mode |
| 0x2F | elst_fid | OOO | List File ID |
| (0x31 | ecre_rec | xxO | Create Record) |
| (0x32 | edel_rec | xxO | Delete Record) |
| 0x33 | eupd_rec | OOO | Update Record |
| 0x34 | erea_rec | OOO | Read Record |
| (0x35 | eupd_rcm | xxO | Update Record Mode) |
| 0x41 | epol_car | OOO | Poll Card |
| 0x51 | eini_car | OOO | Initialize Card |
| 0x52 | eupd_cer | xOO | Update My Certificate |
| 0x53 | eupd_cpk | xOO | Update CA Public Key |
| 0x61 | ecre_key | xOO | Create Key |
| 0x62 | edel_key | xOO | Delete Key |
| 0x63 | eupd_key | xOO | Update Key |
| 0x71 | ecfm_cer | xOO | Confirm Certificate |

\* Not loaded on the present chip/16 First version.

4.3 List of Error Codes

An error code of a command in the present chip is expressed by a signed integer. When an operation is closed normally, either E_OK=0 or a positive number representing a result of the operation is returned. If the operation is not closed normally and some errors occur, a negative number is returned. The error code is expressed by the following conventions.

• Description "E_" represents a general error that occurs in local command processing in the chip (common to the error codes of a related chip).

• Description "EN_" represents a general error concerning communication (common to the error codes of a related chip except session error).

• Description "ES_" mainly represents a general error concerning security (dedicated to the present chip).

TABLE 13

Table: List of error codes of the present chip API

| Code | Mnemonic | Meaning |
|---|---|---|
| -0x00 | E_OK | Normally Closed |
| -0x05 | E_SYS | System Error |
| -0x0a | E_NOMEN | Memory Shortage |
| -0x11 | E_NOSPT | Unsupported Function |
| -0x21 | E_PAR | Parameter Error |

TABLE 13-continued

Table: List of error codes of the present chip API

| Code | Mnemonic | Meaning |
|---|---|---|
| -0x23 | E_ID | Invalid ID Number |
| -0x34 | E_NOEXS | No Object Exists |
| -0x3f | E_OBJ | Invalid Object Status |
| -0x41 | E_MACV | Memory Not Accessible, Memory Access Violation |
| -0x42 | E_OACV | Object Access Violation |
| -0x55 | E_TMOUT | Polling Failed or Timeout |
| -0x72 | EN_OBJNO | Specify Object Number Not Accessible By The Present Chip |
| -0x73 | E_PROTO | Protocol Not Supported By The Present Chip |
| -0x74 | E_RSFN | Command Not Supported By The Present Chip |
| -0x77 | EN_PAR | Parameter Is Not In The Range Supported By The Present Chip Is Specified |
| -0x7a | EN_EXEC | Not Executable Due To Resource Shortage On The Present Chip Side |
| -0x7f | EN_NOSES | No Specified Session |
| -0x81 | ES_AUTH | Authentication Error |
| -0x82 | ES_EACL | Access Control Violation |

4.4 MAC, Trailer

TABLE 14

| MAC ID | Length (bytes) | Contents |
|---|---|---|
| 0x01 | 16 | Check SUM |
| 0x02 | 2 | CRC-CCITT |
| 0x03 | 4 | Reserved |
| 0x04 | 16 | Reserved |
| 0x05 | 16 | HMAC with MD5 (RFC 2085) |
| 0x06 | 16 | Reserved |

1 Check SUM

TABLE 15

| D0 | D1 | D2 | D3 | D4 | D5 | D6 | D7 |
|---|---|---|---|---|---|---|---|
| MAC ID | | MAC Length | | | Reserved | | |
| | | | MAC (1) | | | | |
| | | | ... | | | | |
| | | | MAC (16) | | | | |

2 CRC-CCITT
Generation polynomial in CRC-CCITT
$G(X) = X^{16} + X^{12} + X^5 + 1$
\*When a packet size is an odd number, CRC is performed after the latter byte is subjected to null padding.

TABLE 16

| D0 | D1 | D2 | D3 | D4 | D5 | D6 | D7 |
|---|---|---|---|---|---|---|---|
| MAC ID | | MAC Length | | | Reserved | | |
| MAC | | | | | | | |

5 HMAC with MD5 [RFC 2085]

Used in a session/transaction encryption communication path.

First 64 bytes in a key of a secret key encryption for the encryption communication path is used as a key K. Here, HMAC is calculated by the following formula.

MD5 (K xor opad|MD5 (K xor ipad|TEXT))

opad+the byte 0x36 repeated 64 times
ipad+the byte 0x36 repeated 64 times

"|" means simple bit append.

e.g. ("0100"|"1001")=("01001001")

\* In the case of performing the encryption communication after establishment of the session, a number obtained by repeating a 16-byte encryption key for 4 times, in other words, an exchanged random number in the case of RSA authentication of eopn_ses ( ), is used as the 64-byte secret key by appending as follows.

$$K=Ra|Rb|Ra|Rb|Ra|Rb|Ra|Rb|$$

TABLE 17

| D0 | D1 | D2 | D3 | D4 | D5 | D6 | D7 |
|---|---|---|---|---|---|---|---|
| MAC ID | | MAC Length | | | Reserved | | |
| | | MAC (1) | | | | | |
| | | MAC (2) | | | | | |

4.5 Session Communication and Non-session Communication

Regarding communication with the present chip, the session/transaction as the "encryption" communication path is established after the "mutual authentication", and "encrypted" message communication is performed thereafter. Concerning the "erea_rec command" (i.e. read the contents of the record), non-session communication, which is directly executed without passing through an "authentication" phase, is supported. In this event, it is possible to start up by retrieving the command with the "session ID=0", instead of establishing a session. This access by the non-session communication will be successful if the relevant file permits "the other access". At this point, an access packet is not encrypted. This is used in places where a "touch & go application" is highly required, such as in ticket gating.

\* A service provider will bear a higher risk by use of this mode. The following sound source chip is incorporated.

5. eTP Key Certificate

Utilization of the certificate upon authentication during session establishment

1. Outline

The mutual authentication upon establishing a session with the present chip /16 is based on the premise of a public key basis and existence of PKI.

The present chip ID is allocated to each of the present chip-incorporated CHs and the present chip-incorporated SCs, and the pair of a public key and a secret key for authentication is allocated upon issuance.

A certificate signed by the present chip-incorporated CA is always stored inside the present chip-incorporated CH or the present chip-incorporated SC, so that the present chip-incorporated CH and the present chip-incorporated SC can indicate the possession of the officially issued pairs (of the present chip ID and public key) to each other when establishing the session/transaction.

\*Although it is assumed that there will be a plurality of the present chip-incorporated CA in the future, the present chip-incorporated CA is limited to one in this version.

In the certificate, the signature (S_ca(id, PK_id)) of the present chip-incorporated CA certifies that the present chip ID, the pair of the public keys, and (id, PK_id) are officially issued.

2. Details

As a step prior to an authentication step, the present chip-incorporated nodes (which refer to the present chip-incorporates SC and the present chip-incorporated CH collectively) transmit the public keys of the present chips of their own to each other as the certificates signed by the present chip device issuer. \* see Note (1)

The present chip-incorporated node has a public key of a key signed by a certificate issuer in the form of a certificate. Validity is confirmed by use of this key.

Then, the following is verified. \*see Note (2)

"Validity of the public key transmitted from the opponent node"

="the official signature by the issuer"+"the certificate in validity period"

When the validity is not confirmed, the communication is cut off without establishing the session. \*see Note (3)

\* Note (1)

In the authentication on the public key basis, consideration should also be made regarding the case where the certificate is "cancelled and nullified" upon transferring/exchanging a high value in a session thereafter. The present chip /16 uses either one of the following:

1. a CRL (nullified list), (however, the data size becomes large); or 2. server access for inquiring whether or not a specific certificate is "cancelled and nullified".

\* Note (2)

In addition, it is also possible to place an inqury whether or not the certificate is "cancelled and nullified" as described in Note (1).

\* Note (3)

Before confirmation of the validity of the certificate is completed, it is effective to start the authentication step tentatively and adopt an implementation in which the validity is confirmed by another task, while transmitting a packet necessary for the authentication to the opponent, or waiting for a packet necessary for the authentication from the opponent. Although such an implementation requires interruption and a multi-task OS to be achieved in the chip, it is still effective means for implementing the entire authentication in a short processing time period.

The foregoing description is a device for reducing the time required for initial setting of communication of the node such as the present chip or a card. The node implemented on a server machine should always complete confirmation of the signature off-line in the first place and then proceed to confirmation of "cancellation and nullification". This is for preventing a DoS which is a waste of server inquiry processing attributable to transmission of an invalid certificate from a device having the invalid certificate.

The format of the eTP key certificate (ver. 0.1)

TABLE 18

| D0 | D1 | D2 | D3 | D4 | D5 | D6 | D7 |
|---|---|---|---|---|---|---|---|
| ver | Reserved | Certificate number | Signature method | Reserved | | Issuer ID | |
| Start of Expiration Date | | | | End of Expiration Date | | | |
| | | The present chip ID (1) | | | | | |
| | | The present chip ID (2) | | | | | |
| CAKEY # | Reserved | Key length | | Signature length | | Reserved | |
| Public key (1) | | | | | | | |
| ... | | | | | | | |
| Public key (17) | | | | | | | |
| Signature (1) | | | | | | | |
| ... | | | | | | | |
| Signature (16) | | | | | | | |

• ver: a version number of the certificate format, which is set as ver="1" in ver. 0.1
• Certificate number: a certificate serial number of the key for the present chip ID
• Signature method: signature algorithm specifiers
  0: the portion up to the key field portion of the certificate is subjected to SHA-1 hash, and the result is subjected to RSA encryption (implementation)
  1: Reserved
  2: Reserved
  3: Reserved
• Issuer ID: an ID of the issuer (a CA station) of the certificate, which is fixed to "0" in ver. 0.1
• Start of Effective duration, End of Expiration Date: effective duration of the certificate
• Unsigned 4 octet integers (Accumulation of seconds starting from 0:00 AM on Jan. 1, 2000)
• CAKEY#: an ID number of a key for distinction when a plurality of keys are used by the CA for key signature
• Key length: a bit-length size of a key having an added end.
 * When the key is not a multiple number of 8 octets in the certificate, "0" is added (null padding) to the end of the key field for storing the key, and the key is thereby stored as 8-octet multiple number data. The "key length" bit in the key field is an effective key.
• Signature length: A bit length of the hash (such as sha-1) used for the signature to be added to the end
 * The hash obtains 8-octet multiple number data with null padding at the last if necessary, and then creates the signature by encrypting the number with the CA key.
When the signature is confirmed, this 8-octet multiple number data added to the end are decrypted with the public key of a CA server saved in the present chip-incorporated node. The head signature length bit among the decrypted values becomes a hash value to be used for confirmation.
• Concrete example of the length (when RSA/sha-1 signature is applied):
  RSA
    The public key for the present chip authentication is set to 1024 bits by RSA
    1024 bits=128 bytes=16×8 bytes
    "sha-1" is used as a hash function for signature
  sha-1
    An output of sha-1 is 160 bits
    160 bits=20 bytes
This byte length is made to be a multiple of 8 by null padding, and the 24-byte data are signed by RSA encryption.
The overall length of the certificate is calculated as follows:
  the length of the certificate is equal to
  • a fixed length portion (40 bytes); and
  the length of the key portion is equal to
  • a signature portion (128 bytes),
accordingly, the overall length is equal to the sum of the two portions (168 bytes).
Since the signature portion after encryption requires 1024 bits, the length of 128 bytes is used.
However, it should be noted that the key portion is not simply equal to 128 bytes.
This is because, regarding the RSA key, a common quotation of 1024 bits as the public key takes the pair of N of 1024 bits and an exponent e(e, N) into account. Therefore, it is necessary to input the both (e, N) into the key portion.
In the case of RSA, the e and N will be inputted to the key field as described below.

The byte length for e: (1 byte)
The value e itself: This is expanded into a byte unit as required to be buried as a byte sequence. Subsequently, the value N is buried as a byte sequence.
Considering the case where e=3 in (e, N), as an example, the byte data of 130 bytes is inputted to the key field as described below.
Public Key=0x01|0x03| byte sequence of N (128 bytes)
Since 130 is not a multiple of 8, the value is padded to 136 bytes. Hence, the key data occupies 136 bytes.
Accordingly, the overall length can be calculated as follows:

| | |
|---|---|
| fixed length portion | (40 bytes) |
| +length occupied by the key portion | (136 bytes) |
| +signature portion | (128 bytes) |
| | =304 bytes |

In this way, the aggregate length is equal to 304 bytes when e=3.

6. Key Entity

The key entity is a system data format which compiles an encryption key and information necessary for value information operation by use of the encryption key. The encryption key and the information are stored in a normal file by the present chip.

TABLE 19

| D0 | D1 | D2 | D3 | D4 | D5 | D6 | D7 |
|---|---|---|---|---|---|---|---|
| keyObj ID | | Encryption Mode Specifier | | | Reserved | | |
| | | | | KEY (1) | | | |
| | | | | KEY (2) | | | |
| BANK ID | | Reserved | | | Balance of Payment | | |
| | LEN | | | | Reserved | | |

Encryption Mode Specifier: Specifies which encryption algorithm each of KEY (1) and KEY (2) is a key for. As described below, such specification is performed by the same mode as specification of the encryption algorithm for the encryption communication path in "eopn_ses".

TABLE 20

| Encryption Mode Specifier | Types of Encryption |
|---|---|
| 0x01 | DES |
| 0x02 | 3DES |
| 0x03 | Rijndael |
| 0x04 | Hierocrypt-3 |
| 0x05 | Camellia |

7. Standard Content Format of the Invention

The standard content format is a standard content data format which manipulates a value information operation inside the present chip. By operating the key entity, it is possible to add an encryption/decryption operation and to change accounting information inside the key entity to be atomic in this event.
Basically, an assumption is made herein that a sales model that charges money for decrypting of the encrypted contents is surely performed inside the present chip.
■ Overall Content Format

TABLE 21

(A) Content Header
(B) Accounting Header
(C) Encryption Content Body
(D) Signature Trailer

(A) Content Header

TABLE 22

| D0 | D1 | D2 | D3 | D4 | D5 | D6 | D7 |
|---|---|---|---|---|---|---|---|
| Content ID | | Segment ID | | Publisher Info. | | | |

(B) Accounting Header

TABLE 23

| D0 | D1 | D2 | D3 | D4 | D5 | D6 | D7 |
|---|---|---|---|---|---|---|---|
| Payment Scheme Parameter (3) | | Expression Length Parameter (4) | | Parameter (1) Parameter (5) | | Parameter (2) Parameter (6) | |

(C) Encrypted Contents

TABLE 24

| D0 | D1 | D2 | D3 | D4 | D5 | D6 | D7 |
|---|---|---|---|---|---|---|---|
| Encryption Mode Specifier | Data Length LEN | | | Reserved | | | |
| Encryption KEY (1) | | | | | | | |
| Encryption KEY (2) | | | | | | | |
| Encrypted Content Body (1) | | | | | | | |
| ... | | | | | | | |
| Encrypted Content Body (m) | | | | | | | |

\* The encryption KEYs (1) and (2) are encrypted by the use of the key which is stored in the key entity required for decrypting the contents. In the present chip /16, only common-key encryption is considered as the encryption of the key entity due to the factor of the file capacity thereof, and public-key encryption will not be considered herein (because the data length of the encryption key thereof will be elongated after encryption)

(D) Signature Trailer

TABLE 25

| D0 | D1 | D2 | D3 | D4 | D5 | D6 | D7 |
|---|---|---|---|---|---|---|---|
| Signature ID | | Signature Length | | Reserved | | | |
| Signature (1) | | | | | | | |
| ... | | | | | | | |
| Signature (n) | | | | | | | |

\* The mode of signature will be set to the same mode as a signature trailer of an eTP packet.

K is created by the following method using K1 and K2 obtained by decrypting the encryption key (1) and the encryption key (2) included in the contents with a key in the key entity as 64-byte secret keys in the case of HMAC with MD 5 [RFC 2085]

$$K = K1|K2|K1|K2|K1|K2|K1|K2$$

■ Accounting Header

TABLE 26

| Payment Method | Payment scheme Parameter | Parameter 2 | ... |
|---|---|---|---|
| Fixed Price Payment | 0x01 | Price (unit: sen (0.01 yen)) | — |

■ Encrypted Contents

TABLE 27

| Encryption Mode Specifier | Types of Encryption |
|---|---|
| 0x01 | DES |
| 0x02 | 3DES |
| 0x03 | Rijndael |
| 0x04 | Hierocrypt-3 |
| 0x05 | Camellia |

■ Signature Trailer
Similar specifications to the packet of the present chip

8. Settlement Processing in Operating Standard Contents of the Invention by the Key Entity The following method is adopted as a calculation method using the key entity.

(1) Calculation of a charged amount of the accounting header in the present encryption contents (which is only a fixed amount in the present chip /16).

(2) Subtraction processing for an amount of settlement from a MONEY field of the key entity.

9. Specifications of the Present Chip API (Data Type Definitions)

| | |
|---|---|
| B | Signed 1-byte integer |
| UB | Unsigned 1-byte integer |
| H | Signed 2-byte integer |
| UH | Unsigned 2-byte integer |

| | |
|---|---|
| SID | Unsigned 1-byte integer (Session Id) |
| FID | Unsigned 2-byte integer (File/Folder Id) |
| RID | Unsigned 2-byte integer (Record Id) |
| CACL | Unsigned 2-byte integer (Chip Access Control List) |
| FACL | Unsigned 2-byte integer (File Access Control List) |
| KEYACL | Unsigned 2-byte integer (Key Object Access Control List) |
| TIME | Unsigned 4-byte integer (Accumulation of seconds starting from 0:00AM on January 1, 2000) |
| ERR | Signed 2-byte integer |

• Definition Examples by C Language Expressions

```
#typedef unsigned char UB:
#typedef unsigned short UH:
#typedef unsigned long UW:
#typedef struct etronid {
    UB item[16] ;
}ETRONID;              /* the present chip ID */
#typedef UB SID;       /* Session ID */
#typedef UB FID;       /* File ID */
#typedef UH RID;       /* Record ID */
#typedef UH CACL;      /* Chip Access Control List */
```

-continued

```
        #typedef UH FACL;           /* File Access Control List */
        #typedef UH KEYACL;         /* Key Entity Access Control
List */
        #define ISSUER_MODE 1       /* Issuer Mode */
        #define OWNER_MODE 2        /* Owner Mode */
        #define FILE_DYNAMIC 0x01   /* Dynamic Multi-record
File */
        #define FILE_STATIC 0x02    /* Static Single-record
File */
        #typedef UH TME;            /* Time */
```

10. Specifications of the Present Chip API (Command Definitions)

10.1 Session Management Command Group Session Construction Open/Confirm Session

[Feature Outline]

A safe session transmission path is constructed for the present chip. The "eopn_ses" is used in the case of using authentication when 1 path is satisfactory, and the "eopn_ses" and "ecnf_ses" are used in this order in the case of using authentication which requires 2 paths.

By this session construction, a temporarily common encryption key, which is effective only during the session between the present chip-incorporated service client side, Caller and the present chip side, a Callee side, is shared in common.

The mode of authentication and the encryption type are selectable in accordance with parameters in the packet. An error occurs when authentication/encryption unusable on the present chip side is specified.

```
            [Function expression]
            ERR eopn_ses (ETRONID destId, ETRONID srcId, TIME t,
                        UB authMode, UB authAlgorithm,
                        UB sessionAlgorithm, UH len,
                        UB*authData, UH*rlen,
                        UB**rAuthData);
                destId          the chip ID of the present chip being
            an object for issuing a command
                                (Destination present chip ID)
                srcId           the present chip of the present
            chip-incorporated service client calling the command
                                (Source present chip ID)
                t               time
                authMode        specify the authentication mode
                authAlgorithm   the specifier of the algorithm used
            for authentication
                sessionAlgorithm the specifier of the encryption
            algorithm in a session after authentication
                len             an outbound packet length (an octet
            number)
                authData        data to be passed from the present
            chip-incorporated service client to the present chip for
            authentication (len-16)
                rlen            a return packet length (an octet
            number)
                rAuthData       data returned from the present chip
            to the present chip-incorporated service client for
            authentication (rlen-8)
            [Parameter values]
                □ authMode
                0x01  ISSUER      Issuer mode
                0x02  OWNER       Owner mode
                □ authAlgorithm
                0x01  Reserved
                0x02  RSA (off-line authentication using a certificate)
                0x03  RSA (on-line authentication for confirming the
            CRL)
                0x04  Reserved
```

□ sessionAlgorithm
0x01  DES
0x02  3DES
0x03  Reserved
0x04  Reserved
0x05  Reserved

[Return values]
in the 1-path authentication
> 0  Session ID (upon normal closing)
< 0  Error code
in the 2-path authentication
<= 0 Error code

[Outbound Packet Format]

TABLE 28

| D0 | D1 | D2 | D3 | D4 | D5 | D6 | D7 |
|---|---|---|---|---|---|---|---|
| Reserved | Serial (0x01) | Command ID (0x01) | | Len (octet) | | Reserved | |
| t | | | | auth Mode | auth Algorithm | ses Algorithm | auth Data |
| authData | | | | | | | |
| ... | | | | | | | |
| authData | | | | | | | |

TABLE 29

| Field Name | Data Length | Meaning |
|---|---|---|
| Command ID | 2(=0x01) | Command Code |
| len | 2 | Packet Length (octet number) |
| t | 4 | Time |
| authmode | 1 | Authentication Mode |
| authAlgorithm | 1 | Authentication Algorithm Specifier |
| sessionAlgorithm | 1 | Session Encryption Algorithm Specifier |
| authData | len-16 | Data for Authentication |

[Return Packet Format]

TABLE 30

| D0 | D1 | D2 | D3 | D4 | D5 | D6 | D7 |
|---|---|---|---|---|---|---|---|
| Reserved | Serial (0x01) | Error Code | | rLen (octet) | | Reserved | |
| t | | | | auth Mode | auth Algorithm | ses Algorithm | auth Data |
| rAuthData | | | | | | | |
| ... | | | | | | | |
| rAuthData | | | | | | | |

TABLE 31

| Field Name | Data Length | Meaning |
|---|---|---|
| Error Code | 2 | Error Code (, Session ID (in the 1-path case)) |
| rlen | 2 | Return Packet Length (octet number) |
| rAuthData | rlen-8 | Data for Authentication |

[Function Expression]

```
ERR ecnf_ses (ETRONID destId, ETRONID srcId, TIME t,
        UH len, UB*authData, UH*rlen,
        UB**rAuthData);
    destId      the chip ID of the present chip being
the object for issuing a command
                (Destination present chip ID)
    srcId       the present chip of the present
chip-incorporated service client calling the command
                (Source present chip ID)
    t           time
    len         an outbound packet length (an octet
number)
    authData    data to be passed from the present
chip-incorporated service client to the present chip for
authentication (len-12)
    rlen        a return packet length (an octet
number)
    rAuthData   data returned from the present chip
to the present chip-incorporated service client for
authentication (rlen-8)
    [Return values]
    > 0     Session ID (upon normal closing)
    < 0     Error code
```

[Outbound Packet Format]

TABLE 32

| D0 | D1 | D2 | D3 | D4 | D5 | D6 | D7 |
|---|---|---|---|---|---|---|---|
| Reserved | Serial (0x02) | Command ID (0x02) | | len (octet) | | Reserved | |
| t | | | | | | | |
| ... | | | | | | | |
| authData | | | | | | | |
| authData | | | | | | | |

TABLE 33

| Field Name | Data Length | Meaning |
|---|---|---|
| Command ID | 2(=0x02) | Command Data |
| len | 2 | Packet Length (octet) |
| t | 4 | Time |
| authData | len-12 | Data for Authentication |

[Return Packet Format]

TABLE 34

| D0 | D1 | D2 | D3 | D4 | D5 | D6 | D7 |
|---|---|---|---|---|---|---|---|
| Reserved | Serial (0x02) | Error Code | | rlen | | Reserved | |
| rAuthData | | | | | | | |
| ... | | | | | | | |
| rAuthData | | | | | | | |

TABLE 35

| Field Name | Data Length | Meaning |
|---|---|---|
| Error Code | 2 | Error Code, Session ID |
| rlen | 2 | Return Packet Length (octet number) |
| rAuthData | len-8 | Data for Authentication |

[Detailed Feature]

The "open/confirm session" command establishes a session as the safe encryption communication path after the mutual authentication between the present chip-incorporated service client and the present chip. The concrete actions depend on the authentication and encryption modes, and the modes usually depend on an encryption supporting function of the present N chip hardware (implementation dependency). A session establishment protocol includes authentication in the issuer mode and authentication in the owner mode, which are distinguished by the authmode parameter in the "open session" command.

■ Authentication in the Issuer Mode (Authmode=ISSUER) by the Public Key Encryption

TABLE 36

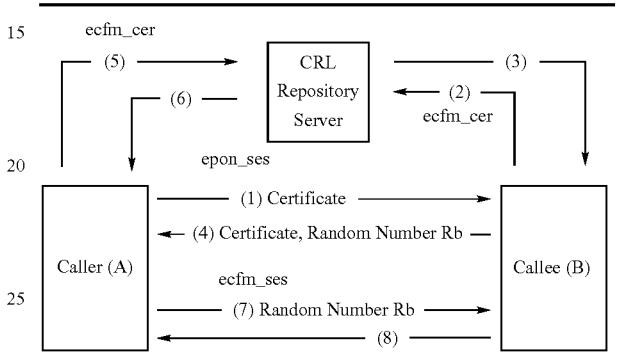

```
(1) eopn_ses (A → B)
<<Parameter Example>>
authMode                    0x02 (ISSUER)
authAlgorithm               0x03 (RSA: on-line
authentication for confirming CRL)
sessionAlgorithm            0x02 (3DES)
authData                    the eTP public key certificate
for A
MAC trailer                 check sum
<<Action by B>>
Confirm the validity of the eTP certificate for A
Confirm the expiration date of the eTP certificate
Confirm the signature on the eTP certificate by use
of the public key of the CA station → to (2)
Confirm the CRL list
Retrieve the public key for A
(2) ecfm_cer (B → CRL Rep.Server)
<<Parameter Example>>
checkMode                   0x00
certificateId               **********
MAC trailer                 check sum
(3) ecfm_cer (B ← CRL Rep.Server)
<<Parameter Example>>
Error Code                  E_OK or not
MAC trailer                 check sum
(4) eopn_ses (A ← B)
<<Parameter Example>>
Error Code                  E_OK or not
authMode                    0x02 (ISSUER)
authAlgorithm               0x03 (RSA: on-line
authentication for confirming CRL)
sessionAlgorithm            0x02 (3DES)
authData                    1. the eTP public key certificate for
B
                            2. a value obtained by RSA encryption
of the 64-bit random number Rb with the public key for A
MAC trailer                 check sum
<<Action by A side>>
Confirm the validity of the eTP certificate for B
Confirm the expiration date of the eTP certificate
Confirm the CRL list → to (5)
Confirm the signature on the eTP certificate by use
of the public key of the CA station
Retrieve the public key for B out of the certificate
Retrieve the random number Rb received in authData2.
after decryption with the secret key for A
Assign the retrieved random number Rb as part of the
secret key of 3DES for session encryption
```

TABLE 36-continued

```
        Create digital signature for the retrieved random
number Rb by use of the secret key for A
        (5) ecfm_cer (A → CRL Rep.Server)
        <<Parameter Example>>
        checkMode                          0x00
        certificateId                      ***********
        MAC trailer                        check sum
        (6) ecfm_cer (A ← CRL Rep.Server)
        <<Parameter Example>>
        Error Code                         E_OK or not
        MAC trailer                        check sum
        (7) ecfm_ses (A → B)
        <<Parameter Example>>
        authData           1. a value obtained by RSA encryption
of the 64-bit Ra with the public key for B, and
                           2. a value obtained by RSA encryption
with the secret key for A, of the digital signature by the
secret key for A for the random number received from B,
are appended and transmitted
        MAC trailer                        check sum
        <<Action by B side>>
        Retrieve Ra and the digital signature obtained by
decrypting the data received in authData with the public key
for A
        Assign the retrieved Ra as part of the secret key of
3DES for session encryption
        Create digital signature for the retrieved Ra by use
of the secret key for B
        Confirm the retrieved signature with the public key
for A
        (8) ecfm_ses (Caller ← Callee)
        <<Parameter Example>>
        Error Code                         E_OK or not
        authData                  the digital signature for the
random number Ra received from A according to the secret key
for B
        MAC trailer                        check sum
        <<Action by A side>>
        Confirm the received signature by use of the public
key of B
        (supplementary) Details of authentication algorithms
        Details of algorithms
        Keys for encryption and authentication
        Secret key sk= d
        Public key pk= (e, n)
        Encryption algorithm for a normal sentence m
        E_pk(m) = m^e mod n
        Decryption algorithm for an encrypted sentence c
        D_sk(C) = c^d mod n
        Signature creation algorithm for a message M
        f_sk(M) = (h(M))^d mod n
        Here, h(M) is a hash function such as MD5 or SHA-1
        Verification algorithm for signature s to the message
M
        g_pk(M,s)= if(h(M)==s^e mod n) then 1 else 0 endif
        List of information owned by the respective nodes
        CA station (C)
        Public key for CA pk_c (130B)
        Secret key for CA sk_c (128B)
        Caller (A) side
        Public key for A                   pk_a (130B)
        Secret key for A                   sk_a (128B)
        Certificate for A                  cer_a (304B)
        Signature of CA station in certificate for A    s_(a,c)
(128B)
        Public key for CA station          pk_c (130B)
        Random number Ra created during mutual authentication
(8B)
        Callee (B) side
        Public key for B                   pk_b (130B)
        Secret key for B                   sk_b (128B)
        Certificate for B                  cer_b (304B)
        Signature of CA station in certificate for B    s_(b,c)
(128B)
        Public key for CA station          pk_c (130B)
        Random number Rb created during mutual authentication
(8B)
        Details of authentication algorithms on the RSA basis
by the eTP
        eopn_ses: (A) → (B)
        [Transmitted information]     (cer_a)     *total 304
bytes
        Certificate for A                  cer_a:
                                           including   PK_a   and
s_(a,c)
        [Action by B]
        Confirmation of the expiration date of the certificate
        Confirmation of the signature of the certificate
                                g_(pk_c)(cer_a, s_(a,c))
        Confirmation of the CRL of the certificate
        eopn_ses: (A) ← (B)
        [Transmitted information]     (cer_b | rb)    *total
432 bytes
        Certificate for B                  cer_b:
                                           including   pk_b   and
s_(b,c)
        Random number (Rb) created by B    rb=E_(pk_a)(Rb)
        [Action by A]
        Confirmation of the expiration date of the certificate
        Confirmation of the signature of the certificate
                                g_(pk_c)(cer_b, s_(b,c))
        Confirmation of the CRL of the certificate
        Decryption of the message (rb)     Rb'=D_(sk_a)(rb)
        Creation of the signature for the received random number
(Rb')                                      srb=f_(sk_a)(Rb')
        ecfm_ses: (A) → (B)
        [Transmitted information]     (x_a1 | x_a2)   *total
256 bytes
        The random number (Ra) and the signature (srb) created
by A                                       x_a1=E_(pk_b)(Ra)
                                           x_a2=E_(pk_b)(srb)
        [Action by B]
        Decryption of the message (x_a)
                                           Ra'=D_(sk_b)(x_a1)
                                           srb'=D_(sk_b)(x_a2)
        Verification of the received signature (srb)
                                           g_(pk_a)(Rb,srb')
        Creation of the signature for the received random number
(Ra')                                      sra=f_(sk_b)(Ra')
        ecfm_ses: (A) ← (B)
        [Transmitted information]     (x_b) *total 128
bytes
        The signature (sra) created by B   x_b=E_(pk_a)(sra)
        [Action by A]
        Decryption of the message (x_b)    sra'=D_(sk_a)(x_b)
        Verification of the received signature (sra)
                                           g_(pk_b)(Ra,sra')
        In this way, a pair of (Ra,Rb) are left to both A and
B, and a session common key is created therefrom by a certain
algorithm.
        Setting of encryption communication parameters after
establishing the session
        Example)          a 3DES case
        3DES encryption based on the E-D-E mode using Ra-Rb-Ra
is performed. In this event, the value stored in the sid column
of the outbound packet of "eopn_ses ( )" is used as the session
ID. In other words, the session id, which was specified by
the caller who was first called, is used as it is.
        Example)          a DES case
```

DES encryption is performed by use of Rb as the key.

In this event, Ra is used as the session ID.

■ Authentication in the Owner Mode (Authmode=OWNER) According to the Secret Key Encryption An example of an operation for establishing the session according to the 2-path mode owner authentication using the "eopn_ses" and "ecfm_ses" will be described below. This mode basically applies the following method. Specifically, the present chip retains a password depending on the owner, and authentication is performed by use of the password. When authentication is started, the present chip creates a random number and transmits the random number to the R/W. Thereafter, the R/W side uses the random number to encrypt the password, and then transmits the password to the present chip.

TABLE 37

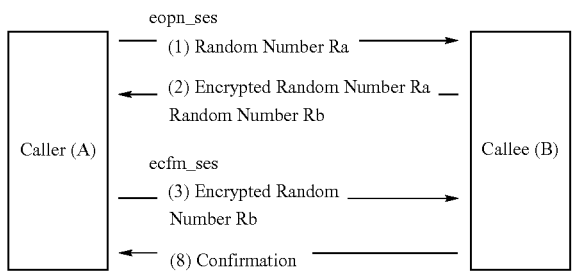

eopn_ses
(1) Random Number Ra →
← (2) Encrypted Random Number Ra
    Random Number Rb
Caller (A)    Callee (B)
ecfm_ses
—— (3) Encrypted Random →
    Number Rb
← (8) Confirmation (1) eopn_ses (A → B)
The random number Ra is created, then,
ID_A; and
Ra
are transmitted to B.
(2) eopn_ses (A ← B)
The random number Rb is created, then,
X1= E1_Key(ID_A | Ra); and
X2= E2_P(Pb)
are calculated and returned to A.
(3) ecfm_ses (A → B)
  a. Decryption is performed by D1_Key(X1) and Ra is confirmed.
(Authentication is performed to qualify the present chip).
  b. R_B= D2_P(X2) is calculated and X2 is decrypted to retrieve Rb.
  c. R'b is created by modifying R_B by means of partial bit inversion, then,
Y= E3_P(R'b)
is created and trasmitted to B.
(4) ecfm_ses (A ← B)
Decryption is performed by D3_p(Y) and R'b is confirmed.
(Authentication is performed to confirm that the
qualified owner is operating through the present
chip-incorporated service client)
.
The session ID (sid) is created from Ra and is returned to A
Here, "|" means to append and join bit sequences. For example, when A= "010010011" and B= "00100101", then,
(A | B)= "01001001100100101"
ID_A and ID_B represent the present chip IDs (128 bits) of the present chip-incorporated service client (A) and the present chip (B), respectively.
When E2 is assumed to be the operation of DES, the E3 is an operation in which an argument is bit-inverted and then subjected to DES.
  Closing of the session
  Close Session
  [Feature outline]
  The session is closed.
  [Function expression]
  ERR ecls_ses (SID sid, ETRONID destId, ETRONID srcID,
                  TIME t, UH len, UH*rlen);
    destId        the chip ID of the present chip being an object of a command
                (Destination present chip ID)
    srcId         the present chip ID of the present chip-incorporated service client calling the command
                (Source present chip ID)
    t                time
    len          an outbound packet length (an octet number)
    rlen        a return packet length (an octet number)
  [Return value]
  <= 0 Error code

[Outbound Packet Format]

TABLE 38

| D0 | D1 | D2 | D3 | D4 | D5 | D6 | D7 |
|---|---|---|---|---|---|---|---|
| SID | Serial No. | Command ID (0x03) | | Len (12) | | Reserved | |
| t | | | | | | | |

TABLE 39

| Field Name | Data Length | Meaning |
|---|---|---|
| Command ID | 2(=0x03) | Command Code |
| len | 2(=12) | Packet Length (octet number) |
| t | 4 | Time |

[Return Packet Format]

TABLE 40

| D0 | D1 | D2 | D3 | D4 | D5 | D6 | D7 |
|---|---|---|---|---|---|---|---|
| SID | Serial No. | Error Code | | Len (8) | | Reserved | |

TABLE 41

| Field Name | Data Length | Meaning |
|---|---|---|
| Error Code | 2 | Error Code(, Session ID) |
| rlen | 2 | Return Packet Length (octet number) |

[Access Control]
This command is always usable by the present chip-incorporated service client which constructed the session.

[Detailed feature]
  The established session is closed.
  10.2 Transaction management command group
    Construction of a transaction session
    Open/Confirm Transaction
    [Feature outline]
    A transaction session is constructed for the present chip. The "eopn_tra" is used in the case of using authentication when 1 path is satisfactory, and the "eopn_tra" and "ecnf_tra" are used in this order in the case of using authentication which requires 2 paths.
    * Basic operations are similar to "eopn_ses" and "ecfm_ses". However, the difference is roll-back capability regarding the subsequent processing.
    [Function expression]
    ERR eopn_tra (ETRONID destId, ETRONID srcId, TIME t,
                    UB authMode, UB authAlgorithm,
                  UB sessionAlgorithm, UH len,
                  UB*authData, UH*rlen,
                  UB**rAuthData);
    destId        the chip ID of the present chip being an object of a command
                (Destination present chip ID)
    srcId         the present chip of the present chip-incorporated service client calling the command
                (Source present chip ID)
    t              time
    authMode    specify the authentication mode
    authAlgorithm    the specifier of the algorithm used for authentication
    sessionAlgorithm    the specifier of the encryption algorithm in a session after authentication
    len          an outbound packet length (an octet

```
        number)
            authData        data to be passed from the present
    chip-incorporated service client to the present chip for
    authentication (len-16)
            rlen            a return packet length (an octet
    number)
            rAuthData       data returned from the present chip
    to the present chip-incorporated service client for
    authentication (rlen-8)
            [Parameter values]
            refer to "eopn_ses"
            [Return values]
            in the 1-path authentication
            > 0    Session ID (upon normal closing)
            < 0    Error code
            in the 2-path authentication
            <= 0   Error code
```

[Outbound Packet Format]

TABLE 42

| D0 | D1 | D2 | D3 | D4 | D5 | D6 | D7 |
|---|---|---|---|---|---|---|---|
| Reserved | Serial (0x01) | Command ID (0x04) | | Len | | Reserved | |
| t | | authMode | authAlgorithm | sesAlgorithm | authData | | |
| authData | | | | | | | |
| ... | | | | | | | |
| authData | | | | | | | |

TABLE 43

| Field Name | Data Length | Meaning |
|---|---|---|
| Command ID | 2(=0x04) | Command Code |
| len | 2 | Packet Length (octet number) |
| t | 4 | Time |
| authmode | 1 | Authentication Mode |
| authAlgorithm | 1 | Authentication Algorithm Specifier |
| sessionAlgorithm | 1 | Session Encryption algorithm Specifier |
| authData | len-16 | Data for Authentication |

[Return Packet Format]

TABLE 44

| D0 | D1 | D2 | D3 | D4 | D5 | D6 | D7 |
|---|---|---|---|---|---|---|---|
| Reserved | Serial (0x01) | Error Code | | Rlen (octet) | | Reserved | |
| rAuthData | | | | | | | |
| ... | | | | | | | |
| rAuthData | | | | | | | |

TABLE 45

| Field Name | Data Length | Meaning |
|---|---|---|
| Error Code | 2 | Error Code (, Session ID (in the 1-path case)) |
| rlen | 2 | Return Packet Length (octet number) |
| rAuthData | rlen-8 | Data for Authentication |

[Function expression]
ERR ecnf_tra (ETRONID destId, ETRONID srcId, TIME t,

```
                                    UH len, UB*authData,
                                    UH*rlen, UB**rAuthData);
            destId          the chip ID of the present chip being
    an object of a command
                                    (Destination present chip ID)
            srcId           the present chip of the present
    chip-incorporated service client calling the command
                                    (Source present chip ID)
            t               time
            len             an outbound packet length (an octet
    number)
            authData        data to be passed from the present
    chip-incorporated service client to the present chip for
    authentication (len-12)
            rlen            a return packet length (an octet
    number)
            rAuthData       data returned from the present chip
    to the present chip-incorporated service client for
    authentication (rlen-8)
            [Return values]
            > 0    Session ID (upon normal closing)
            < 0    Error code
```

[Outbound Packet Format]

TABLE 46

| D0 | D1 | D2 | D3 | D4 | D5 | D6 | D7 |
|---|---|---|---|---|---|---|---|
| Reserved | Serial (0x02) | Command ID (0x05) | | len (octet) | | Reserved | |
| t | | | | | | authData | |
| ... | | | | | | | |
| authData | | | | | | | |

TABLE 47

| Field Name | Data Length | Meaning |
|---|---|---|
| Command ID | 2(=0x02) | Command Code |
| len | 2 | Packet Length (octet number) |
| t | 4 | Time |
| authData | len-12 | Data for Authentication |

[Return Packet Format]

TABLE 48

| D0 | D1 | D2 | D3 | D4 | D5 | D6 | D7 |
|---|---|---|---|---|---|---|---|
| Reserved | Serial (0x02) | Error Code | | rlen (octet) | | Reserved | |
| rAuthData | | | | | | | |
| ... | | | | | | | |
| rAuthData | | | | | | | |

TABLE 49

| Field Name | Data Length | Meaning |
|---|---|---|
| Error Code | 2 | Error Code(, Session ID) |
| rlen | 2 | Return Packet Length (octet number) |
| rAuthData | rlen-8 | Data for Authentication |

[Detailed Feature]
Similar to "eopn_ses" and "ecfm_ses" Concerning authentication and encryption However, only the following present chip APIs can be issued after establishment of the transaction. An error will occur if any other API is issued.

- Create File ecre_fil
- Delete File edel_fil
- Create Record ecre_rec
- Delete Record edel_rec
- Update Record eupd_rec It must be guaranteed that the command sequences issued herein are reflected when "econ_tra" is issued, and that the command sequences are completely rolled back either in the event of issuance of "eabo_tra" or in the event of timeout after passage of a certain time period without issuance of "ecom_tra".

Closing of the transaction
Commit/Abort Transaction
[Feature outline]
The transaction is closed. "ecom_tra" is used for the closure by committing, and "eabo_tar" is used for the closure by aborting.
[Function expression]
ERR ecom_tra (SID sid, ETRONID destId,
                ETRONID srcID, TIME t, UH len,
                UH*rlen);
destId      the chip ID of the present chip being an object of a command
          (Destination present chip ID)
srcId       the present chip ID of the present chip-incorporated service client calling the command
          (Source present chip ID)
t         time
len       an outbound packet length (an octet number)
rlen      a return packet length (an octet number)
[Return value]
<= 0   Error code

[Outbound Packet Format]

TABLE 50

| D0 | D1 | D2 | D3 | D4 | D5 | D6 | D7 |
|---|---|---|---|---|---|---|---|
| Reserved | Serial No. | Command ID (0x06) | | len (12) | | Reserved | |
| | t | | | | | | |

TABLE 51

| Field Name | Data Length | Meaning |
|---|---|---|
| Command ID | 2(=0x06) | Command Code |
| len | 2(0x0C) | Packet Length (octet number) |
| t | 4 | Time |

[Return Packet Format]

TABLE 52

| D0 | D1 | D2 | D3 | D4 | D5 | D6 | D7 |
|---|---|---|---|---|---|---|---|
| SID | Serial No. | Error Code | | rlen (8) | | Reserved | |

TABLE 53

| Field Name | Data Length | Meaning |
|---|---|---|
| Error Code | 2 | Error Code(, Session ID) |
| rlen | 2 (0x08) | Return Packet Length (octet number) |

[Function expression]
ERR eabo_tra (SID sid, ETRONID destId,
               ETRONID srcID, TIME t, UH len,
             UH*rlen);
destId      the chip ID of the present chip being an object of a command
          (Destination present chip ID)
srcId       the present chip ID of the present chip-incorporated service client calling the command
          (Source present chip ID)
t         time
len       an outbound packet length (an octet number)
rlen      a return packet length (an octet number)
[Return value]
<= 0   Error code

[Outbound Packet Format]

TABLE 54

| D0 | D1 | D2 | D3 | D4 | D5 | D6 | D7 |
|---|---|---|---|---|---|---|---|
| SID | Serial No. | Command ID (0x07) | | len (12) | | Reserved | |
| | t | | | | | | |

TABLE 55

| Field Name | Data Length | Meaning |
|---|---|---|
| Command ID | 2(=0x07) | Command Code |
| len | 2(0x0C) | Packet Length (octet number) |
| t | 4 | Time |

[Return Packet Format]

TABLE 56

| D0 | D1 | D2 | D3 | D4 | D5 | D6 | D7 |
|---|---|---|---|---|---|---|---|
| SID | Serial No. | Error Code | | rlen (8) | | Reserved | |

TABLE 57

| Field Name | Data Length | Meaning |
|---|---|---|
| Error Code | 2 | Error Code(, Session ID) |
| rlen | 2 | Return Packet Length (octet number) |

[Access Control]
This command is always usable by the present chip-incorporated service client which constructed the session.
[Detailed Feature]
- The established transaction is committed or aborted.
- When the transaction is committed, all the commands issued between "ecfm_tra" and "ecom_tra" are reflected to a nonvolatile memory of the present chip.
- When the transaction is aborted or when no commitment arrives after waiting for a certain time period, then all the commands issued between "ecfm_tra" and "ecom_tra" are reflected to a nonvolatile memory of the present chip.

10.3 File Management Command Group

[Restricted items for implementation]
A file in this system has the following restrictions.
Upper limit number of usable files    50
File ID                                0 to 49
Upper limit of a file size             256 (octets)
Creation of a file
Create File
[Feature outline]
A (vacant) file is created.
[Function expression]
ERR ecre_fil (SID sid, ETRONID destId, ETRONID srcId,
              TIME t, UH len, FID fid, UH blk,
              UH cnt, FACL facl, UH*rlen);
  sid       session ID
  destId    the chip ID of the present chip being
an object of a command
            (Destination present chip ID)
  srcId     the present chip ID of the present
chip-incorporated service client calling the command
            (Source present chip ID)
  t         time
  fid       the file ID to be created
  facl      an initial value of the file access
control list
  blk       a starting address of the file (which
is fixed to "1" herein)
  cnt       a file length (an octet number)
  len       an outbound packet length (an octet number)
  rlen      a return packet length (an octet number)
[Return values]
  > 0  Created File ID (upon normal closing)
  < 0  Error code

[Outbound Packet Format]

TABLE 58

| D0 | D1 | D2 | D3 | D4 | D5 | D6 | D7 |
|---|---|---|---|---|---|---|---|
| SID | Serial No. | Command ID (0x21) | | len (24) | | Reserved | |
| t | | | | fid | | Reserved | |
| facl | | Reserved | | blk | | cnt | |

TABLE 59

| Field Name | Data Length | Meaning |
|---|---|---|
| Command ID | 2(=0x21) | Command Code |
| len | 2(=0x18) | Packet Length (octet number) |
| t | 4 | Time |
| fid | 2 | File ID |
| facl | 2 | Initial Access Control List |
| blk | 2 | 0x0000 |
| cnt | File ID | File Length (octet) |

[Return Packet Format]

TABLE 60

| D0 | D1 | D2 | D3 | D4 | D5 | D6 | D7 |
|---|---|---|---|---|---|---|---|
| SID | Serial No. | Error Code | | rlen (8) | | Reserved | |

TABLE 61

| Field Name | Data Length | Meaning |
|---|---|---|
| Error Code | 2 | File ID, Error Code |
| rlen | 2(=0x08) | Return Packet Length (octet number) |

[Access Control]
• Always usable in the issuer mode (the present chip ID of the ISSUER of a parent folder is equals to the present chip ID of the SC which constructed the Session)
• Usable in the owner mode and the other mode if permitted in the access control list of the parent folder

[Detail of operation]
A file having the file ID specified by fid is created.
An error occurs when the specified fid is already in use.
Deletion of the file
Delete File
[Feature outline]
The file is deleted.
[Function expression]
ERR edel_fil (SID sid, ETRONID destId, ETRONID srcId,
              TIME t, UH len, FID fid, UH*rlen);
  sid       the session ID
  destId    the chip ID of the present chip being
an object of a command
            (Destination present chip ID)
  srcId     the present chip ID of the present
chip-incorporated service client calling the command
            (Source present chip ID)
  t         time
  fid       the file ID to be deleted
  len       an outbound packet length (an octet number)
  rlen      a return packet length (an octet number)
[Return values]
  <= 0  Error code

[Outbound Packet Format]

TABLE 62

| D0 | D1 | D2 | D3 | D4 | D5 | D6 | D7 |
|---|---|---|---|---|---|---|---|
| SID | Serial No. | Command ID (0x22) | | len (16) | | Reserved | |
| t | | | | fid | | Reserved | |

TABLE 63

| Field Name | Data Length | Meaning |
|---|---|---|
| Command ID | 2(=0x22) | Command Code |
| len | 2(=0x10) | Packet Length (octet number) |
| t | 4 | Time |
| fid | 2 | File ID to be deleted |

[Return Packet Format]

TABLE 64

| D0 | D1 | D2 | D3 | D4 | D5 | D6 | D7 |
|---|---|---|---|---|---|---|---|
| SID | Serial No. | Error Code | | rlen (8) | | Reserved | |

TABLE 65

| Field Name | Data Length | Meaning |
|---|---|---|
| Error Code | 2 | File ID, Error Code |
| rlen | 2(=0x08) | Return Packet Length (octet number) |

[Access Control]
• The following conditions must be satisfied to execute "edel_fil". Attention is needed herein because two types of access control lists are involved.
(CASE 1) Case of the Owner Authentication Access
1. It must be permitted that the route folder may be subjected to the command "edel_fil" as the "owner access". In other words, "ACL2 of the route folder==1" must be satisfied.
2. It must be permitted that the object file may be subjected to the command "edel_fil" as the "owner access". In other words, "ACL8 of the file==1" must be satisfied.
(CASE 2) Case of the Issuer Authentication Access
1. It must be permitted that the route folder may be subjected to the command "edel_fil" as the "other access". In other words, "ACL3 of the route folder==1" must be satisfied.
2. It does not depend on ACL on the object file side (always OK).
(CASE 3) Case of the Other Access
1. It must be permitted that the route folder may be subjected to the command "edel_fil" as the "other access". In other words, "ACL3 of the route folder==1" must be satisfied.
2. It must be permitted that the object file may be subjected to the command "edel_fil" as the "other access". In other words, "ACL9 of the file==1" must be satisfied.
[Detail of Operation]
The file having the file ID specified by fid is deleted. A control block specifying a physical position of the file is cleared and the nonvolatile memory is released, and in addition, all data in the memory is set to "0" or "1".
Request for Transferring a File
Request File Transfer
[Feature Outline]
The contents of the file are transferred to other present chip-incorporated contents holder.

```
[Function expression]
ERR atra_fil (SID sid, ETRONID destId, ETRONID srcID,
              TIME t, UH len, FID fid,
              ETRONID targetID, Fid targetFid,
              UH*rlen);
    sid         the session ID
    destId      the chip ID of the present chip being
an object of a command
                (Destination present chip ID)
    srcId       the present chip ID of the present
chip-incorporated service client calling the command
                (Source present chip ID)
    t           time
    fid         the file ID to be created
    targetId    the present chip ID of a transfer
destination of the file
    targetFid   the file ID of the file to be
transferred at the transfer destination
    len         an outbound packet length (an octet
number)
    rlen        a return packet length (an octet
number)
```

[Return values]
> 0  Data length actually updated (normal closing)
< 0  Error code

[Packet Format]

TABLE 66

| D0 | D1 | D2 | D3 | D4 | D5 | D6 | D7 |
|---|---|---|---|---|---|---|---|
| SID | Serial No. | Command ID (0x23) | | len (36) | | Reserved | |
| | | t | | | fid | Reserved | |
| | | | | targetId | | | |
| | | | | targetId | | | |
| target Fid | | Reserved | | | | | |

TABLE 67

| Field Name | Data Length | Meaning |
|---|---|---|
| Command ID | 2(=0x23) | Command Code |
| len | 2(=0x24) | Packet Length (octet number) |
| t | 4 | Time |
| Fid | 2 | File ID |
| targetId | 16 | The Present Chip ID of Destination to which File is transferred |
| targetFidId | 2 | File ID of Transfer Destination |

[Return Packet Format]

TABLE 68

| D0 | D1 | D2 | D3 | D4 | D5 | D6 | D7 |
|---|---|---|---|---|---|---|---|
| SID | Serial No. | Error Code | | rlen (8) | | Reserved | |

TABLE 69

| Field Name | Data Length | Meaning |
|---|---|---|
| Error Code | 2 | File ID, Error Code |
| rlen | 2(=0x08) | Return Packet Length (octet number) |

[Detail of Operation]
A chip in which this system call occurred performs a series of processing described below.
The following present chip API sequences are issued to the transfer destination chip.

| | |
|---|---|
| Establish Transaction Session | eopn_tra |
| | ecfm_tra |
| Create File | ecre_fil |
| Create Record | ecre_rec |
| . | . |
| . | . |
| . | . |
| Commit Transaction | ecom_tra |

The transaction is aborted if any abnormality is detected in mid-course. Meanwhile, the commands in the session are not reflected unless the commit command arrives normally.

Encrypting and decrypting of the file data
Encrypting/Decrypting File
[Feature outline]
The file storing the encrypted contents is decrypted.
[Function expression]
ERR eenc_fil (SID sid, ETRONID destId, ETRONID srcID,
 TIME t, UB len, FID srcFid,
 FID destFid, FID keyed, UB*rlen,
 UW*currentMoney, UW*payedMoney);
ERR ednc_fil (SID sid, ETRONID destId, ETRONID srcId,
 TIME t, UB len, FID srcFid,
 FID destFid, FID keyed, UB*rlen,
 UW*currentMoney, UW*payedMoney);
sid          the session ID
destId       the chip ID of the present chip being an object of a command
             (Destination present chip ID)
srcId        the present chip ID of the present chip-incorporated service client calling the command
             (Source present chip ID)
t            time
srcFid       the file ID where the encrypted contents are stored
destFid      the file ID storing the decrypted contents
keyId        the file ID storing the key entity to be used for decryption processing
currentMoney the balance of money left in the key entity
payedMoney   the amount of money settled this time
len          an outbound packet length (an octet number)
rlen         a return packet length (an octet number)
[Return value]
< =0 Error code
[Packet format]

TABLE 70

| D0 | D1 | D2 | D3 | D4 | D5 | D6 | D7 |
|---|---|---|---|---|---|---|---|
| SID | Serial No. | Command ID (0x34,35) | | len (84 + signature length) | | Reserved | |
| t | | | | srcFid | | Reserved | |
| destFid | Reserved | | | keyed | | Reserved | |

TABLE 71

| Field Name | Data Length | Meaning |
|---|---|---|
| Command ID | 2(0x34, 35) | Command Code |
| len | 2 | Packet Length (octet number) |
| t | 4 | Time |
| srcFid | 1 | Original File ID |
| destFidl | 1 | Output Destination File ID |
| keyed | 1 | Key Entity ID |

[Return Packet Format]

TABLE 72

| D0 | D1 | D2 | D3 | D4 | D5 | D6 | D7 |
|---|---|---|---|---|---|---|---|
| SID | Serial No. | Error Code | | rlen (16) | | Reserved | |
| currentMoney | | | | payedMoney | | | |

TABLE 73

| Field Name | Data Length | Meaning |
|---|---|---|
| Error Code | 2 | File ID, Error Code |
| rlen | 2 | Return Packet Length (octet number) |
| currentMoney | 4 | Balnace of Money in Key Entity |
| payedMoney | 4 | Amount of MoneySettled This Time |

[Detailed Feature]
■ Operaton of edic_fil( )

TABLE 74

| Encrypted Contents (srcFid) | Decrypted Contents (destFid) |
|---|---|
| (A) Content Header | → (A) Content Header |
| (B) Accounting Header | → (B) Accounting Header |
|  | → |
| Encryption Key (1) | 00000000000000000000000000 |
| Encryption Key (2) | 00000000000000000000000000 |
| Encrypted Content Body (1) | → Decrypted Content Body (1) |
| ... | → ... |
| Encrypted Content Body (m) | → Decrypted Content Body (m) |
| (D) Signature Trailer | → (D) Signature Trailer |

■ Operation of eenc_fil( )

TABLE 75

| Original Contents (srcFid) | Encrypted Contents (destFid) |
|---|---|
| (A) Content Header | → (A) Content Header |
| (B) Accounting Header | → (B) Accounting Header |
|  | → |
| Original KEY (1) | → Encrypted Key (1) |
| Original KEY (2) | → Encrypted Key (2) |
| "Raw" Content Body (1) | → Encrypted Content Body (1) |
| ... | → ... |
| "Raw" Content Body (m) | → Encrypted Content Body (m) |
|  | (D) Signature Trailer |

Encryption of the contents is carried out with the "Original KEY".
Encryption of the KEY is carried out with the specified key of the key entity.
Signature acts on the data after completion of encryption.
A value obtained by repeating the Original KEY for four times is used as the 64-bit secret key K in HMAC with MD5.
Changing the access control list of the file
Update File Mode
[Feature outline]
The access control list of the file is changed.
[Function expression]
ERR eupd_fim (SID sid, ETRONID destId, ETRONID srcId,
 TIMEt, UHlen, FIDfid, FILACLfilacl, TABLE 75-continued

| Original Contents | Encrypted Contents |
|---|---|
| | UH*rlen); |
| sid | the session ID |
| destId | the chip ID of the present chip being an object of a command |
| | (Destination present chip ID) |
| srcId | the present chip ID of the present chip-incorporated service client calling the command |
| | (Source present chip ID) |
| t | time |
| fid | the file ID of the object of change in the access control list |
| filacl | update data of the file access control list |
| callerId | the present chip Id of the present chip-incorporated service client calling the command |
| len | an outbound packet length (an octet number) |
| rlen | a return packet length (an octet number) |
| [Return value] | |
| <= 0 Error code | |

[Outbound Packet Format]

TABLE 76

| D0 | D1 | D2 | D3 | D4 | D5 | D6 | D7 |
|---|---|---|---|---|---|---|---|
| SID | Serial No. | Command ID (0x27) | | len (20) | | Reserved | |
| t | | | | fid | | Reserved | |
| filacl | | Reserved | | | | | |

[Return Packet Format]

TABLE 77

| Field Name | Data Length | Meaning |
|---|---|---|
| Command ID | 2(=0x27) | Command Code |
| len | 2(=0x14) | Packet Length (octet number) |
| t | 4 | Time |
| fid | 2 | File ID |
| filacl | 2 | File Access Control List |

[Return Packet Format]

TABLE 78

| D0 | D1 | D2 | D3 | D4 | D5 | D6 | D7 |
|---|---|---|---|---|---|---|---|
| SID | Serial No. | Error Code | | rlen (8) | | Reserved | |

TABLE 79

| Field Name | Data Length | Meaning |
|---|---|---|
| Error Code | 2 | File ID, Error Code |
| rlen | 2(=0x08) | Return Packet Length (octet number) |

[Access Control]
• Always usable in the issuer mode (the present chip ID of the ISSUER of a parent folder is equals to the present chip ID of the SC which constructed the Session) with respect to the object file
• Usable in the owner mode and the other mode if permitted in the access conrol list of the object file
[Feature Outline]
The access control list of the file is changed to a specified value.

Obtainment of a list of defined files
List File_ID
[Feature outline]
A list of the defined file is obtained.
[Function expression]
ERR elst_fid (SID sid, ETRONID destId, ETRONID srcId,
 TIME t, UH len, FID fid, UH*rlen,
 UB**fileCtrlBlk);
 sid the session ID
 destId the chip ID of the present chip being an object of a command
  (Destination present chip ID)
 srcId the present chip ID of the present chip-incorporated service client calling the command
  (Source present chip ID)
 t time
 fid the object file ID
 fileCtrlBlk a control block of the object file
 len an outbound packet length (an octet number)
 rlen a return packet length (an octet number)
[Return value]
<= 0 Error code
[Outbound packet format]

TABLE 80

| D0 | D1 | D2 | D3 | D4 | D5 | D6 | D7 |
|---|---|---|---|---|---|---|---|
| SID | Serial No. | Command ID (0x2F) | | len (16) | | Reserved | |
| t | | | | fid | | Reserved | |

TABLE 81

| Field Name | Data Length | Meaning |
|---|---|---|
| Command ID | 2(=0x2F) | Command Code |
| len | 2(16) | Packet Length (octet number) |
| t | 4 | Time |
| fid | 2 | File ID |

[Return Packet Format]

TABLE 82

| D0 | D1 | D2 | D3 | D4 | D5 | D6 | D7 |
|---|---|---|---|---|---|---|---|
| SID | Serial No. | Error Code | | rlen | | Reserved | |
| | | FileCtrlBlk | | | | | |
| | | ... | | | | | |
| | | FileCtrlBlk | | | | | |

TABLE 83

| Field Name | Data Length | Meaning |
|---|---|---|
| Error Code | 2 | File ID, Error Code |
| rlen | 2 | Return Packet Length (octet number) |
| fileCtrlBlk | *rlen-8 | Control Block of Object File |

[Access Control]
- Always usable in the issuer mode (the present chip ID of the ISSUER of a parent folder is equals to the present chip ID of the SC which constructed the Session) with respect to the object file
- Usable in the owner mode and the other mode if permitted in the access control list of the object file 10.4 Record Management Command Group

```
Updating the record data
Update Record
[Feature outline]
The contents of a record are changed.
[Function expression]
ERR eupd_rec(SID sid, ETRONID destId, ETRONID srcId,
             TIME t, UH len, FID fid, UH blk,
             UH cnt, UB*data, UH*rlen);
    sid       the session ID
    destId    the chip ID of the present chip being
              an object of a command
              (Destination present chip ID)
    srcId     the present chip ID of the present
chip-incorporated service client calling the command
              (Source present chip ID)
    t         time
    fid       the file ID to be changed
    blk       a record number to be changed (fixed
to 1 herein)
    cnt       a record data length to be changed
(an octet number)
    data      the contents of data to be changed
(cnt octet)
    len       an outbound packet length (an octet
number)
    rlen      a return packet length (an octet
number)
[Return values]
> 0 Data length actually updated (normal closing)
< 0 Error code
```

[Packet Format]

TABLE 84

| D0 | D1 | D2 | D3 | D4 | D5 | D6 | D7 |
|---|---|---|---|---|---|---|---|
| SID | Serial No. | Command ID (0x33) | | len | | Reserved | |
| t | | | | fid | | Reserved | |
| blk | | cnt | | data | | | |
| data | | | | | | | |
| ... | | | | | | | |
| data | | | | | | | |

TABLE 85

| Field Name | Data Length | Meaning |
|---|---|---|
| Command ID | 2(0x33) | Command Code |
| len | 2 | Packet Length (octet number) |
| t | 4 | Time |
| fid | 2 | File ID |
| blk | 2 | Changed Record ID (fixed to 1 herein) |
| cnt | 2 | Data Length (octet number) |
| data | Cnt | Data to be Written |

[Return Packet Format]

TABLE 86

| D0 | D1 | D2 | D3 | D4 | D5 | D6 | D7 |
|---|---|---|---|---|---|---|---|
| SID | Serial No. | Error Code | | rlen (8) | | Reserved | |

TABLE 87

| Field Name | Data Length | Meaning |
|---|---|---|
| Error Code | 2 | File ID, Error Code |
| rlen | 2 | Return Packet Length (octet number) |

[Access Control]
- Always usable in the issuer mode (the present chip ID of the ISSUER of a parent folder is equals to the present chip ID of the SC which constructed the Session) with respect to the object file
- Usable in the owner mode and the other mode if permitted in the access control list of the object record

[Detail of Operation]
A request for writing data of cnt octets from the beginning in a blk record is issued. An upper limit may be provided to cnt depending on hardware conditions. The actually written octet number is returned to rCnt.

```
Reading the data out of the record
Read Record
[Feature outline]
The contents of the record is read out.
[Function expression]
ERR erea_rec (SID sid, ETRONID destId, ETRONID srcId,
              TIME t, UH len, FID fid, UH blk,
              UH cnt, UH*rlen, UH*rCnt, UB*rData);
    sid       the session ID
    destId    the chip ID of the present chip being
              an object of a command
              (Destination present chip ID)
    srcId     the present chip ID of the present
chip-incorporated service client calling the command
              (Source present chip ID)
    t         time
    fid       the file ID to be read out
    blk       the record ID to be read out
    cnt       a data length to be read out (an octet
number)
    rCnt      a length of the data actually read
out (an octet number)
    rData     the read-out data (rCnt octet)
    len       an outbound packet length (an octet
number)
    rlen      a return packet length (an octet
number)
[Return value]
<= 0 Error code
[Packet format]
```

TABLE 88

| D0 | D1 | D2 | D3 | D4 | D5 | D6 | D7 |
|---|---|---|---|---|---|---|---|
| SID | Serial No. | Command ID (0x33) | | len | | Reserved | |
| t | | | | fid | | Reserved | |
| blk | | cnt | | | | | |

TABLE 89

| Field Name | Data Length | Meaning |
| --- | --- | --- |
| Command ID | 2(0x34) | Command Code |
| len | 2 | Packet Length (octet number) |
| t | 4 | Time |
| fid | 2 | File ID |
| blk | 2 | Record ID |
| cnt | 2 | Data Length (octet) |

[Return Packet Format]

TABLE 90

| D0 | D1 | D2 | D3 | D4 | D5 | D6 | D7 |
| --- | --- | --- | --- | --- | --- | --- | --- |
| SID | Serial No. | Error Code | | rlen (8) | | Reserved | |
| rCnt | | Reserved | | | | rData | |
| | | rData | | | | | |
| | | ... | | | | | |
| | | rData | | | | | |

TABLE 91

| Field Name | Data Length | Meaning |
| --- | --- | --- |
| Error Code | 2 | Read Out Data Length (octet number), Error Code |
| rCnt | 2 | Data Length Actually Read Out (octet number) |
| rData | rCnt | Read Out Data |

[Access Control]
• Always usable in the issuer mode (the present chip ID of the ISSUER of a parent folder is equals to the present chip ID of the SC which constructed the Session) with respect to the object record
• Usable in the owner mode and the other mode if permitted in the access control list of the object record

[Detail of Operation]
A request for reading data of cnt octets from the beginning in the blk record is issued. An upper limit may be provided to cnt depending on hardware conditions. The octet number actually read is returned to rCnt.

The command is normally issued and executed when the session is established. However, it is also possible to call the command with sid=0 by the present chip-incorporated service client which does not establish the session, by specialization of "touch & go" applications. In this case, execution of the command succeeds when reading out with the other authority is permitted in the access control list of the record.

10.5 Key Entity Management Command Group

[Restricted Items for Implementation]
A key entity in this system has the following restrictions.

| | |
| --- | --- |
| Upper limit number of usable files | 10 |
| Key entity ID | 0 to 9 |
| Upper limit of a key entity size 256 (octets) | |

Creation of a key entity
Create Key Object

[Feature outline]

[Function expression]
ERR ecre_key (SID sid, ETRONID destId, ETRONID srcId,
　　　　　TIME t, UH len, UH kid,
　　　　　UH keyAlgorithm, UB*Key, UH bankId,
　　　　　KEYACL acl, UL initMoney Val,
　　　　　UH*rlen);

| | |
| --- | --- |
| sid | the session ID |
| destId | the chip ID of the present chip being an object of a command (Destination present chip ID) |
| srcId | the present chip ID of the present chip-incorporated service client calling the command (Source present chip ID) |
| t | time |
| kid | the key entity ID |
| KeyAlgorithm | the encryption algorithm specifier |
| key | an encryption key |
| bankID | a bank ID |
| initMoney Val | an initial amount of money |
| acl | an initial access control list value (unused in the first version) |
| len | an outbound packet length (an octet number) |
| rlen | a return packet length (an octet number) |

[Return value]
<= 0 Error code]

[Packet format]

TABLE 92

| D0 | D1 | D2 | D3 | D4 | D5 | D6 | D7 |
| --- | --- | --- | --- | --- | --- | --- | --- |
| SID | Serial No. | Command ID (0x61) | | len | | Reserved | |
| | | t | | kid | | keyAlgorithm | |
| | | KEY (1) | | | | | |
| | | KEY (2) | | | | | |
| BankID | | acl | | | | initMoney Val | |

TABLE 93

| Field Name | Data Length | Meaning |
| --- | --- | --- |
| Command ID | 2(0x61) | Command Code |
| len | 2 | Packet Length (octet number) |
| t | 4 | Time |
| kid | 2 | Key Entity ID |
| keyAlgorithm | 2 | Encryption Algorithm Specifier |
| key | 16 | Encryption Key |
| bankID | 2 | Bank ID |
| acl | 2 | Initial Access Control List Value (unused in the first version) |
| initMoneyVal | 4 | Initial Money Amount |

[Return Packet Format]

TABLE 94

| D0 | D1 | D2 | D3 | D4 | D5 | D6 | D7 |
| --- | --- | --- | --- | --- | --- | --- | --- |
| SID | Serial No. | Error Code | | rlen (8) | | Reserved | |

TABLE 95

| Field Name | Data Length | Meaning |
| --- | --- | --- |
| Error Code | 2 | Error Code |
| rlen | 2 | Return Packet Length (octet number) |

Deletion of the key entity
Delete Key Object
[Feature outline]
[Function expression]
ERR edel_key (SID sid, ETRONID destId, ETRONID srcId,
　　　　　　　　TIME t, UB len, UH kid, UH*bankId,
　　　　　　　　UL*remainingMoney, UH*rsize,
　　　　　　　　UB**bookList, UH*rlen);
　　sid　　　　　　the session ID
　　destId　　　　the chip ID of the present chip being an object of a command
　　　　　　　　　(Destination present chip ID)
　　srcId　　　　　the present chip ID of the present chip-incorporated service client calling the command
　　　　　　　　　(Source present chip ID)
　　t　　　　　　　time
　　kid　　　　　　the key entity ID to be deleted
　　bankID　　　　the bank ID
　　remainingMoney　a remaining amount of money
　　rsize　　　　　a length of Distribution List
　　bookList　　　Distribution List
　　len　　　　　　an outbound packet length (an octet number)
　　rlen　　　　　a return packet length (an octet number)
[Return value]
　<= 0　　Error code
[Packet format]

TABLE 96

| D0 | D1 | D2 | D3 | D4 | D5 | D6 | D7 |
|---|---|---|---|---|---|---|---|
| SID | Serial No. | Command ID (0x62) | | len | | Reserved | |
| t | | | | kid | | Reserved | |

TABLE 97

| Field Name | Data Length | Meaning |
|---|---|---|
| Command ID | 2(0x62) | Command Code |
| len | 2 | Packet Length (octet number) |
| t | 4 | Time |
| kid | 2 | Key Entity ID |

[Return Packet Format]

TABLE 98

| D0 | D1 | D2 | D3 | D4 | D5 | D6 | D7 |
|---|---|---|---|---|---|---|---|
| SID | Serial No. | Error Code | | rlen (16) | | Reserved | |
| BANK ID | | Reserved | | CurrentMoney Balance after Payment | | | |

TABLE 99

| Field Name | Data Length | Meaning |
|---|---|---|
| Error Code | 2 | Error Code |
| rlen | 2 | Return Packet Length (octet number) |
| bankId | 2 | Bank ID |
| currentMoney | 4 | Current Money Balance |

Updating the key entity
Update Key Object
[Feature outline]
An amount of money in the specified key entity is updated.
[Function expression]
ERR eupd_key (SID sid, ETRONID destId, ETRONID srcId,
　　　　　　　　TIME t, UH len, UH kid, UL addMoney,
　　　　　　　　UH*rlen, UL*currentMoney);
　　sid　　　　　　the session ID
　　destId　　　　the chip ID of the present chip being an object of a command
　　　　　　　　　(Destination present chip ID)
　　srcId　　　　　the present chip ID of the present chip-incorporated service client calling the command
　　　　　　　　　(Source present chip ID)
　　t　　　　　　　time
　　kid　　　　　　the key entity ID to be updated
　　addMoney　　　the amount of money to be added
　　currentMoney　the amount of money after addition
　　len　　　　　　an outbound packet length (an octet number)
　　rlen　　　　　a return packet length (an octet number)
[Return value]
　<= 0　　Error code
[Packet format]

TABLE 100

| D0 | D1 | D2 | D3 | D4 | D5 | D6 | D7 |
|---|---|---|---|---|---|---|---|
| SID | Serial No. | Command ID (0x63) | | len | | Reserved | |
| t | | | | kid | | Reserved | |
| addMoney | | | | | | | |

TABLE 101

| Field Name | Data Length | Meaning |
|---|---|---|
| Command ID | 2(0x63) | Command Code |
| len | 2 | Packet Length (octet number) |
| T | 4 | Time |
| kid | 2 | Key Entity ID to be Updated |
| addMoney | 4 | Amount of Money to be Added |

[Return Packet Format]

TABLE 102

| D0 | D1 | D2 | D3 | D4 | D5 | D6 | D7 |
|---|---|---|---|---|---|---|---|
| SID | Serial No. | Error Code | | rlen (12) | | Reserved | |
| currentMoney Balance after Addition | | | | | | | |

TABLE 103

| Field Name | Data Length | Meaning |
|---|---|---|
| Error Code | 2 | Error Code |
| rlen | 2(12) | Return Packet Length (octet number) |
| currentMoney | 2 | Amount of Money after Addition |

Reading information in the key entity
Read Key Object
[Feature outline]
Information on the amount of money is read out of the specified key entity.
[Function expression]
ERR erea_key (SID sid, ETRONID destId, ETRONID srcId,
            TIME t, UH len, UH kid, UH*rlen,
            UL*currentMoney);
    sid        the session ID
    destId    the chip ID of the present chip being an object of a command
                (Destination present chip ID)
    srcId     the present chip ID of the present chip-incorporated service client calling the command
                (Source present chip ID)
    t          time
    kid       the key entity ID being the object for reading the money amount information
    currentMoney  the current amount of money
    len       an outbound packet length (an octet number)
    rlen      a return packet length (an octet number)
[Return value]
    <= 0    Error code
[Packet format]

TABLE 104

| D0 | D1 | D2 | D3 | D4 | D5 | D6 | D7 |
|---|---|---|---|---|---|---|---|
| SID | Serial No. | Command ID (0x64) | | len | | Reserved | |
| t | | | | kid | | Reserved | |

TABLE 105

| Field Name | Data Length | Meaning |
|---|---|---|
| Command ID | 2(0x63) | Command Code |
| len | 2 | Packet Length (octet number) |
| t | 4 | Time |
| kid | 2 | Key Entity ID to be read |

[Return Packet Format]

TABLE 106

| D0 | D1 | D2 | D3 | D4 | D5 | D6 | D7 |
|---|---|---|---|---|---|---|---|
| SID | Serial No. | Error Code | | rlen (12) | | Reserved | |
| currentMoney | | | | | | | |

TABLE 107

| Field Name | Data Length | Meaning |
|---|---|---|
| Error Code | 2 | Error Code |
| rlen | 2(=12) | Return Packet Length (octet number) |
| currentMoney | 4 | Current Amount of Money |

Updating the access control list of the key entity
Update Key Mode
[Feature outline]
The access control list of the key entity is updated.
* Not loaded in the first version
[Function expression]
ERR eupd_key (SID sid, ETRONID destId, ETRONID srcId,
            TIME t, UH len, UH kid, KEYACL keyacl,
            UH*rlen);
    sid        the session ID
    destId    the chip ID of the present chip being an object of a command
                (Destination present chip ID)
    srcId     the present chip ID of the present chip-incorporated service client calling the command
                (Source present chip ID)
    t          time
    kid       the key entity ID being the object for updating the access control list
    keyacl   the key entity access control list to be updated
    len       an outbound packet length (an octet number)
    rlen      a return packet length (an octet number)
[Return value]
    <= 0    Error code
[Packet format]

TABLE 108

| D0 | D1 | D2 | D3 | D4 | D5 | D6 | D7 |
|---|---|---|---|---|---|---|---|
| SID | Serial No. | Command ID (0x65) | | len | | Reserved | |
| t | | | | kid | | Reserved | |

TABLE 109

| Field Name | Data Length | Meaning |
|---|---|---|
| Command ID | 2(0x65) | Command Code |
| len | 2 | Packet Length (octet number) |
| t | 4 | Time |
| kid | 2 | Key Entity ID to be Updated |
| keyacl | 2 | Key Entity Access Control List |

[Return Packet Format]

TABLE 110

| D0 | D1 | D2 | D3 | D4 | D5 | D6 | D7 |
|---|---|---|---|---|---|---|---|
| SID | Serial No. | Error Code | | rlen (8) | | Reserved | |
| currentMoney | | | | | | | |

TABLE 111

| Field Name | Data Length | Meaning |
|---|---|---|
| Error Code | 2 | Error Code |
| rlen | 2(=8) | Return Packet Length (octet number) |
| currentMoney | 4 | Amount of Money after Addition |

Obtainment of a list of defined key entities
List Key Object ID
[Feature outline]
A list of the defined key entity is obtained.
[Function expression]
ERR elst_kid (SID sid, ETRONID destId, ETRONID srcId,
              TIME t, UH len, KID kid, UH*rlen,
              UB**keyCtrlBlk);
  sid              the session ID
  destId          the chip ID of the present chip being an object of a command
                    (Destination present chip ID)
  srcId           the present chip ID of the present chip-incorporated service client calling the command
                    (Source present chip ID)
  t                time
  kid              the object key entity ID
  keyCtrlBlk     a control block of the object key entity
  len              an outbound packet length (an octet number)
  rlen            a return packet length (an octet number)
[Return value]
  <= 0          Error code
[Outbound Packet format]

TABLE 112

| D0 | D1 | D2 | D3 | D4 | D5 | D6 | D7 |
|----|----|----|----|----|----|----|----|
| SID | Serial No. | Command ID (0x6F) | | len (16) | | Reserved | |
| t | | | | kid | | Reserved | |

Table 113

| Field Name | Data Length | Meaning |
|---|---|---|
| Command ID | 2(=0x6F) | Command Code |
| len | 2(=16) | Packet Length (octet number) |
| t | 4 | Time |
| kid | 2 | Key Entity ID |

[Return Packet Format]

TABLE 114

| D0 | D1 | D2 | D3 | D4 | D5 | D6 | D7 |
|----|----|----|----|----|----|----|----|
| SID | Serial No. | Error Code | | rlen | | Reserved | |
| keyCtrlBlk | | | | | | | |
| ... | | | | | | | |
| keyCtrlBlk | | | | | | | |

TABLE 115

| Field Name | Data Length | Meaning |
|---|---|---|
| Error Code | 2 | Error Code |
| rlen | 2(=8) | Return Packet Length (octet number) |
| keyrlBlk | *rlen-8 | Control Block of Object File |

[Access Control]
• Always usable in the issuer mode (the present chip ID of the ISSUER of a parent folder is equals to the present chip ID of the SC which constructed the Session) with respect to the object key entity
• Usable in the owner mode and the other mode if permitted in the access control list of the object key entity

10.6 Authentication Assistance Management Command Group

Checking the eTP Certificate
Confirm Certificate

Checking the eTP certificate
Confirm Certificate
[Function expression]
ERR ecfm_cer (SID sid, ETRONID destId, ETRONID srcId,
              TIME t, UH len, UB checkMode,
              UH serial, UHcaId, UB*rlen, UB*crl);
  sid              the session ID
  destId          the chip ID of the present chip being an object of a command
                    (Destination present chip ID)
  srcId           the present chip ID of the present chip-incorporated service client calling the command
                    (Source present chip ID)
  t                time
  checkMode      a check mode of a list to be nullified
  serial          a certificate number of a certificate to be confirmed
  caId            the issuer ID of the certificate to be confirmed
  crl              a nullified list (the present chip format)
  len              an outbound packet length (an octet number)
  rlen            a return packet length (an octet number)
[checkMode]
  0x00          return only the check
  0x01          obtain the corresponding nullified list
[Return values]
  > 0           Session ID (upon normal closing)
  < 0           Error code
[Packet format]

TABLE 116

| D0 | D1 | D2 | D3 | D4 | D5 | D6 | D7 |
|----|----|----|----|----|----|----|----|
| SID | Serial No. | Command ID (0x71) | | len | | Reserved | |
| t | | | | checkMode | | Reserved | |
| Serial | | CA ID | | | | | |

TABLE 117

| Field Name | Data Length | Meaning |
|---|---|---|
| Command ID | 2(0x71) | Command Code |
| len | 2 | Packet Length |
| t | 4 | Time |
| checkMode | 2 | Check Mode |
| certificateId | 16 | Certificate ID to be Checked |

[Return Packet Format]

TABLE 118

| D0 | D1 | D2 | D3 | D4 | D5 | D6 | D7 |
|----|----|----|----|----|----|----|----|
| SID | Serial No. | Error Code | | rlen (8) | | Reserved | |
| crl | | | | | | | |
| ... | | | | | | | |
| crl | | | | | | | |

TABLE 119

| Field Name | Data Length | Meaning |
| --- | --- | --- |
| Error Code | 2 | Error Code |
| rlen | 2 | Nullified List Length |
| crl | rlen-8 | Nullified List |

■ 5.3 Quasi Present Chip API Command Definitions

The API commands described below have formats similar to the present chip API commands. Nevertheless, the following commands are not always issued by the present chip-incorporated service client but also issued by other entities. These commands are mainly centered on management and operation depending on the hardware, and interfaces for supporting lower layer of communication. These commands may be issued by a chip reader/writer unit or issued by a computer in the event of fabrication.

Polling a chip
Poll CHIP
[Feature outline]
The status of the present chip is read out (implementation dependency, operation dependency).
    [Function expression]
    ERR epol_car (ETRONID* destId, ETRONID srcId, TIME t);
    destId          the chip ID which is returned upon polling
    srcId           the present chip ID of the present chip-incorporated service client calling the command
    t              time
    [Return value (example)]
    <= 0    Error code
    [Packet format]

TABLE 120

| D0 | D1 | D2 | D3 |
| --- | --- | --- | --- |
| Reserved (0x00) | Serial (0x00) | Com. ID (0x41) | Reserved |

TABLE 121

| Field Name | Data Length | Meaning |
| --- | --- | --- |
| Command ID | 1(0x41) | Command Code |

[Return Packet Format]

TABLE 122

| D0 | D1 | D2 | D3 | D4 | D5 | D6 | D7 |
| --- | --- | --- | --- | --- | --- | --- | --- |
| SID (0x00) | Serial (0x00) | Error Code | rlen (0x08) | cardVersion | | Reserved | |

TABLE 123

| Field Name | Data Length | Meaning |
| --- | --- | --- |
| Error Code | 1 | Error Code |
| cardVersion | 2 | Card Version |
| rlen | 1 | Data Packet Length (=0x08) |

* Both eared and clientId are attached to a chip header and therefore are not included in the main body.

[Access Control]
This API is always usable.
It does not have to be during the session.
[Detailed Feature]
The present chip ID of the chip is stored and returned to a srcID portion in a routing header portion of the return packet of "epol_car". Accordingly, anybody can use this API for obtaining the present chip ID in the beginning.

Anybody can issue this command even if it is not during the session.

Inititalization of the chip
Inititalizate CHIP
[Feature outline]
A chip management portion is created to initialize the present chip.
[Function expression (example)]
    ERR eini_car (ETRONID dstId, ETRONID srcId, TIME t,
                  UB initKey1[8], UB initKey2[8],
                  UB initPasswd[8], UB fileNum,
                  UB keyObjLen, UB swapLen, CACL cacl,
                  UB rsaSecretKey[128], UH len,
                  UH*rlen);
    destId          the chip ID of the present chip being an object of a command
                  (Destination present chip ID)
    srcId           all "1"
    t              time
    initKey1      a common key (1) for authentication
    initKey2      a common key (2) for authentication
    initPasswd    an initial password
    fileNum       an upper limit of the number of files creatable in the chip
    keyObjNum    an upper limit of the number of key entities
    swapLen       the size of a swap area in the nonvolatile memory
    cacl           the access control list of the chip
    rsaSecretKey  a secret key for authentication (RSA) of an own card
    len            an outbound packet length (an octet number)
    rlen           a return packet length (an octet number)
    [Return value]
    <= 0    Error code
    [Packet format]

TABLE 124

| D0 | D1 | D2 | D3 | D4 | D5 | D6 | D7 |
| --- | --- | --- | --- | --- | --- | --- | --- |
| SID | Serial No. | Command ID (0x51) | | len (176) | | Reserved | |
| | | t | | | Reserved | | |
| | | Common Key (1) for Authentication | | | | | |
| | | Common Key (2) for Authentication | | | | | |
| | | Password | | | | | |
| cacl | | fileNum | keyObj Num | swap Len | Reserved | version | |
| | | Own (RSA) Secret Key (1) | | | | | |
| | | ... | | | | | |
| | | Own (RSA) Secret Key (16) | | | | | |

TABLE 125

| Field Name | Data Length | Meaning |
| --- | --- | --- |
| Command ID | 2(0x51) | Command Code |
| len | 2(176) | Packet Length |
| t | 4 | Time |
| initKey1 | 8 | Common Key (1) for Authentication |
| initKey2 | 8 | Common Key (2) for Authentication |

TABLE 125-continued

| Field Name | Data Length | Meaning |
|---|---|---|
| initPasswd | 8 | Authentication Password |
| fileNum | 1 | File Number Upper Limit (50) |
| keyObjNum | 1 | Key Entity Number Upper Limit (10) |
| swapLen | 1 | Swap Area |
| cacl | 1 | Initial Card Access Control List |
| rsaSecretKey | 128 | Own Authentication RSA Key (1024 bits) |

[Return Packet Format]

TABLE 126

| D0 | D1 | D2 | D3 | D4 | D5 | D6 | D7 |
|---|---|---|---|---|---|---|---|
| SID | Serial No. | Error Code | | rlen (8) | | Reserved | |

TABLE 127

| Field Name | Data Length | Meaning |
|---|---|---|
| Error Code | 2 | Error Code |
| rlen | 2 | Return Packet Length |

[Detailed Feature]
A system control block is initialized in accordance with a given argument.
All other memory areas are cleared and set to "0".
[Access Control]
This command is accepted only when the source present chip ID of the present chip=0xff . . . ff (all "1").

Switching the own authentication public key certificate
Update My Certificate
[Feature outline]
The own certificate of the present chip is updated.
[Function expression]
    ERR eupd_cer (ETRONID destId, ETRONID srcId, TIME t, UB*certificate, UH len, UH*rlen);
    sid    the session ID
    destId    the chip ID of the present chip being an object of a command
        (Destination present chip ID)
    srcId    the present chip ID of the present chip-incorporated service client calling the command
        (Source present chip ID)
    t    time
    certificate    the certificate
    len    an outbound packet length (an octet number)
    rlen    a return packet length (an octet number)
    [Return value]
    <= 0 Error code
    [Packet format]

TABLE 128

| D0 | D1 | D2 | D3 | D4 | D5 | D6 | D7 |
|---|---|---|---|---|---|---|---|
| SID | Serial No. | Command ID (0x52) | | len (320) | | Reserved | |
| t | | | | Reserved | | | |
| Certificate (1) | | | | | | | |
| . . . | | | | | | | |
| Certificate (38) | | | | | | | |

TABLE 129

| Field Name | Data Length | Meaning |
|---|---|---|
| Command ID | 2(0x52) | Command Code |
| len | 2(304) | Packet Length |
| t | 4 | Time |
| certificate | 304 | Certificate |

[Return Packet Format]

TABLE 130

| D0 | D1 | D2 | D3 | D4 | D5 | D6 | D7 |
|---|---|---|---|---|---|---|---|
| SID | Serial No. | Error Code | | rlen (8) | | Reserved | |

[Return Packet Format (Example)]

TABLE 131

| Field Name | Data Length | Meaning |
|---|---|---|
| Error Code | 2 | Error Code, Session ID |
| rlen | 2 | Return Packet Length (octet number) |

Switching a CA station public key
Update CA Public Key
[Function expression]
    ERR eupd_cpk (ETRONID destId, ETRONID srcId, TIME t, UB*caPublicKey, UH len, UH*rlen);
    sid    the session ID
    destId    the chip ID of the present chip being an object of a command
        (Destination present chip ID)
    srcId    the present chip ID of the present chip-incorporated service client calling the command
        (Source present chip ID)
    t    time
    caPubicKey    the public key of the CA station
    len    an outbound packet length (an octet number)
    rlen    a return packet length (an octet number)
    [Return value]
    <= 0 Error code
    [Packet format]

TABLE 132

| D0 | D1 | D2 | D3 | D4 | D5 | D6 | D7 |
|---|---|---|---|---|---|---|---|
| SID | Serial No. | Command ID (0x53) | | len (144) | | Reserved | |
| t | | | | Reserved | | | |
| CA Station Public Key (1) | | | | | | | |
| . . . | | | | | | | |
| CA Station Public Key (16) | | | | | | | |

TABLE 133

| Field Name | Data Length | Meaning |
|---|---|---|
| Command ID | 2(0x53) | Command Code |
| len | 2(144) | Packet Length |
| t | 4 | Time |
| certificate | 128 | RSA Certificate (1024 bits) |

[Return Packet Format]

TABLE 134

| D0 | D1 | D2 | D3 | D4 | D5 | D6 | D7 |
|---|---|---|---|---|---|---|---|
| SID | Serial No. | Error Code | | rlen (8) | | Reserved | |

[Return Packet Format (Example)]

TABLE 135

| Field Name | Data Length | Meaning |
|---|---|---|
| Error Code | 2 | Error Code, Session ID |
| rlen | 2 | Return Packet Length (octet number) |

SPECIFICATIONS OF ENCRYPTION IMPLEMENTATION

■ DES

Method of Creating a 56-bit DES Key Out of a 64-bit Secret Key

The lowest bit of each octet is assigned as a parity bit as shown below (a chip just ignores the parity bit but does not check it). The 56 bits obtained by adding the upper 7 bits of 8 octets are used as the DES.

KEY (1)

b7b6b5b4b3b2b1b0    b7b6b5b4b3b2b1    b0b7b6b5b4b3b2b1b0
□□□□□□□■    □□□□□□□    ■□□□□□□□■
b7b6b5b4b3b2b1b0
□□□□□□□■

KEY (2)

b7b6b5b4b3b2b1b0    b7b6b5b4b3b2b1    b0b7b6b5b4b3b2b1b0
□□□□□□□■    □□□□□□□    ■□□□□□□□■
b7b6b5b4b3b2b1b0
□□□□□□□■

■ RSA

Data format of an RSA key
The key is expressed as follows.
d = 1024 bits (128 octets)
n = 1024 bits (128 octets)
e = fixed to 0x0003 (1 octet)
Secret key sk = d (128 octets)
Public Key pk = length of e (1 octet) | e (1 octet) | n (128 octets)

As described above, according to the present invention, the autonomous IC card of the present invention autonomously identifies a communication device to be connected via an IC card terminal and communicates directly with the communication device. Therefore, it is possible to guarantee safe communication of accurate information. Moreover, when the autonomous IC card of the present invention includes an encryption processing unit for performing authentication processing mutually with the communication device and for encrypting and decrypting information concerning communication with the communication device, then it is possible to judge propriety of the communication device and to sufficiently reduce a risk of theft of the data contents or falsification of the data via the intermediate device. The significance of such reduction of the risk is particularly high when the data are related to value information such as an electronic ticket. Furthermore, when the encryption processing unit selects and performs appropriate authentication processing and encryption processing out of a plurality of authentication processing and a plurality of encryption processing depending on the type of the identified communication device, it is possible to perform the processing suitable for the identified communication device.

It should be understood that many modifications and adaptations of the invention will become apparent to those skilled in the art and it is intended to encompass such obvious modifications and changes in the scope of the claims appended hereto.

What is claimed is:

1. An autonomous integrated circuit card comprising:
a host interface configured to connect to a physical layer of an integrated circuit card terminal;
a logical external communication interface configured to communicate with a communication device; and
an integrated circuit chip including a unique identifier representing a physical identity of the chip and an application program interface (API) module therein, the integrated circuit chip recognizing a connection with the communication device via an authentication procedure employing the unique identifier of the integrated circuit chip and a unique identifier of the communication device, said integrated circuit chip configured to autonomously provide peer to peer communications with the communication device via the logical external communication interface using the unique identifier of the integrated circuit chip to establish a communication path, independent of the integrated circuit card terminal, to the communication device.

2. The autonomous integrated circuit card according to claim 1,
wherein the application program interface (API) module includes:
a session management command group which establishes a session communication path for the communication device; and
a transaction management command group which establishes a transaction session for the communication device.

3. The autonomous integrated circuit card according to claim 1, wherein the integrated circuit chip includes an encryption processing unit which performs mutual authentication processing with the communication device and encrypts and decrypts information concerning communication with the communication device.

4. The autonomous integrated circuit card according to claim 3,
wherein the integrated circuit chip identifies the communication device and performs the mutual authentication processing based on the unique identifier of the integrated circuit chip and the unique identifier of the communication device.

5. The autonomous integrated circuit card according to claim 3, wherein the encryption processing unit selects an appropriate authentication process and an appropriate encryption process out of a plurality of authentication processes and a plurality of encryption processes respectively to perform those processes, depending on a type of the communication device identified by the integrated circuit chip.

6. The autonomous integrated circuit card according to claim 1, wherein the integrated circuit chip includes a storage unit which stores value information, and communicates with the communication device concerning the value information.

7. The autonomous integrated circuit card according to claim 6,
wherein the value information includes electronic ticket information and electronic money information.

8. The autonomous integrated circuit card according to claim 1, wherein the integrated circuit chip includes an authentication processing unit which performs mutual authentication processing with the communication device.

9. The autonomous integrated circuit card according to claim 1, wherein the integrated circuit chip includes an encryption/decryption processing unit which encrypts and decrypts information concerning communication with the communication device.

10. The autonomous integrated circuit card according to claim 1, wherein the integrated circuit chip includes a hybrid system for distributing and retaining information.

11. The autonomous integrated circuit card according to claim 1, wherein the application program interface (API) module is configured to communicate with service clients to modify access control with respect to the integrated circuit card.

12. An autonomous integrated circuit card comprising:
a host interface which is configured to provide access to a physical layer of the integrated circuit card;
a logical external communication interface configured to communicate with an operably linked communication device, the integrated circuit card including a unique identifier representing a physical identity of the card which functions as a node ID to enable communication between the integrated circuit card and the communication device;
an integrated circuit chip configured to recognize a connection with the communication device via an authentication procedure employing the unique identifier of the integrated circuit chip and a unique identifier of the communication device, and to autonomously provide peer to peer communications with the communication device via the logical external communication interface using the unique identifier of the integrated circuit card to establish a communication path, independent of an integrated circuit (IC) card terminal, to the communication device; and
an application program interface (API) module stored on the integrated circuit chip and configured to provide the peer to peer communications independent of the integrated circuit (IC) card terminal.

13. The autonomous integrated circuit card according to claim 12, wherein the application program interface (API) module is configured to communicate with service clients to modify access control with respect to the integrated circuit card.

14. An autonomous integrated circuit card comprising:
means for connecting an integrated circuit card terminal to said integrated circuit card;
means for connecting a communication device to said integrated circuit card;
means for managing peer to peer communications to and from said integrated circuit card, said means for managing peer to peer communications including the integrated circuit card including a unique identifier representing a physical identity of the card, said unique identifier functions as a node ID to enable communication between the integrated circuit card and the communication device, the integrated circuit card recognizing a connection with the communication device via an authentication procedure employing the unique identifier of the integrated circuit card and a unique identifier of the communication device; and
said means for managing peer to peer communications is stored on said integrated circuit card, and autonomously provides peer to peer communications with the communication device using the unique identifier of the integrated circuit card to establish a communication path, independent of the integrated circuit card terminal, to the communication device.

15. The autonomous integrated circuit card according to claim 14, wherein the application program interface (API) module is configured to communicate with service clients to modify access control with respect to the integrated circuit card.

* * * * *